United States Patent
Adya et al.

(10) Patent No.: US 9,430,552 B2
(45) Date of Patent: Aug. 30, 2016

(54) VIEW MAINTENANCE RULES FOR AN UPDATE PIPELINE OF AN OBJECT-RELATIONAL MAPPING (ORM) PLATFORM

(75) Inventors: Atul Adya, Redmond, WA (US); Sergey Melnik, Kirkland, WA (US); Zlatko Michailov, Redmond, WA (US); Colin Joseph Meek, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1618 days.

(21) Appl. No.: 11/725,195

(22) Filed: Mar. 16, 2007

(65) Prior Publication Data

US 2008/0228697 A1    Sep. 18, 2008

(51) Int. Cl.
*G06F 17/30* (2006.01)
*G06F 7/00* (2006.01)

(52) U.S. Cl.
CPC ... *G06F 17/30595* (2013.01); *G06F 17/30607* (2013.01)

(58) Field of Classification Search
CPC .......... G06F 17/30091; G06F 17/30165; G06F 21/6218; G06F 17/30592; G06F 8/315; G06F 9/4428; G06F 8/35; G06F 17/30539; G06F 17/30595; G06F 17/30604
USPC .......................................................... 707/2
See application file for complete search history.

(56) References Cited

U.S. PATENT DOCUMENTS

| | | | |
|---|---|---|---|
| 5,717,924 A * | 2/1998 | Kawai ........................... 707/102 |
| 6,026,390 A * | 2/2000 | Ross et al. |
| 6,108,664 A * | 8/2000 | Nori et al. |
| 6,125,360 A * | 9/2000 | Witkowski et al. |
| 6,134,543 A * | 10/2000 | Witkowski et al. |
| 6,272,502 B1 * | 8/2001 | Lieuwen et al. .............. 707/203 |
| 6,484,159 B1 * | 11/2002 | Mumick et al. |
| 6,708,179 B1 * | 3/2004 | Arora |
| 6,847,971 B1 * | 1/2005 | Balaraman et al. |
| 6,882,993 B1 * | 4/2005 | Lawande et al. .............. 707/714 |
| 6,889,358 B1 * | 5/2005 | Lieuwen et al. .............. 715/206 |
| 7,089,225 B2 * | 8/2006 | Li et al. ............................ 707/2 |
| 7,111,020 B1 * | 9/2006 | Gupta et al. |
| 7,158,994 B1 * | 1/2007 | Smith et al. ................... 707/717 |
| 7,467,128 B2 * | 12/2008 | Larson et al. |
| 7,505,957 B2 * | 3/2009 | Cochrane et al. ................ 707/2 |
| 7,734,602 B2 * | 6/2010 | Folkert et al. ................ 707/696 |
| 7,890,497 B2 * | 2/2011 | Folkert et al. ................ 707/718 |

(Continued)

OTHER PUBLICATIONS

IEEE Bulletin of the Technical Committee on Data Engineering Bulletin (Special issue on Materialized Views and Data Warehousing) Jun. 1995, vol. 18 No. 2.*

(Continued)

*Primary Examiner* — Angelica Ruiz
(74) *Attorney, Agent, or Firm* — Nicholas Chen; Kate Drakos; Micky Minhas

(57) ABSTRACT

A database update pipeline may be incorporated into a data access architecture for providing data services to applications, thereby bridging the gap between application data and data as persisted in databases. The update pipeline has the ability to translate changes made to object instances into data store change constructs, and carry those changes over to a data store. Such a pipeline can also advantageously perform the reverse operation, allowing applications to query using the database update pipeline, and receive materialized object instances.

30 Claims, 12 Drawing Sheets

(56) References Cited

U.S. PATENT DOCUMENTS

| | | | |
|---|---|---|---|
| 8,478,742 B2* | 7/2013 | Folkert et al. | 707/718 |
| 2001/0051949 A1* | 12/2001 | Carey et al. | 707/103 R |
| 2003/0093407 A1* | 5/2003 | Cochrane et al. | 707/2 |
| 2004/0122828 A1* | 6/2004 | Sidle et al. | 707/100 |
| 2004/0215626 A1* | 10/2004 | Colossi | G06F 17/30312 |
| 2005/0050068 A1* | 3/2005 | Vaschillo et al. | 707/100 |
| 2005/0131964 A1* | 6/2005 | Saxena | 707/203 |
| 2005/0234971 A1* | 10/2005 | Folkert et al. | 707/102 |
| 2005/0235001 A1* | 10/2005 | Peleg | G06F 17/30383 |
| 2006/0047696 A1* | 3/2006 | Larson et al. | 707/103 R |
| 2006/0085465 A1* | 4/2006 | Nori | G06F 17/30297 |
| 2006/0122964 A1* | 6/2006 | Yu et al. | 707/2 |
| 2006/0155789 A1* | 7/2006 | Wong et al. | 707/204 |
| 2006/0173861 A1* | 8/2006 | Bohannon et al. | 707/100 |
| 2006/0195460 A1 | 8/2006 | Nori et al. | 707/100 |
| 2006/0195476 A1 | 8/2006 | Nori et al. | 707/104.1 |
| 2006/0195477 A1 | 8/2006 | Deem et al. | 707/104.1 |
| 2006/0224564 A1* | 10/2006 | Yu et al. | 707/2 |
| 2006/0253483 A1* | 11/2006 | Yu | 707/101 |
| 2006/0288046 A1* | 12/2006 | Gupta et al. | 707/200 |
| 2007/0192283 A1* | 8/2007 | Larson et al. | 707/2 |
| 2008/0040367 A1* | 2/2008 | Bitonti et al. | 707/101 |
| 2008/0177700 A1* | 7/2008 | Li et al. | 707/3 |
| 2008/0189240 A1* | 8/2008 | Mullins et al. | 707/2 |
| 2008/0195577 A1* | 8/2008 | Fan et al. | 707/2 |

OTHER PUBLICATIONS

Atkinson, M. P. et al., "Types and Persistence in Database Programming Languages," *ACM Comput. Surv.*, 1987,19(2),105-190.

Bancilhon, F. et al., "Update Semantics of Relational Views," *ACM Transactions on Database Systems*, 1981, 6(4), 557-575.

Barsalou, T. et al., "Updating Relational Databases through Object-Based Views," *SIGMOD*, 1991, 1-14.

Bernstein, P. A., "Applying Model Management to Classical Meta-Data Problems," *Conference on Innovative Data Systems Research (CIDR)*, 2003, 12 pages.

Blakeley, J. A. et al., "Efficiently Updating Materialized Views," *ACM SIGMOD International Conference on Management of Data*, 1986, 61-71.

Braganholo, V. P. et al., "From XML View Updates to Relational View Updates: Old Solutions to a New Problem," *International Conference on Very Large Data Bases (VLDB)*, Toronto, Canada, 2004, 12 pages.

Carey, M. J. et al., "Of Objects and Databases: A Decade of Turmoil," *International Conference on Very Large Data Bases (VLDB)*, Mombai, India, 1996.

Carey, M. J. et al., "O-O, What Have They Done to DB2?" *VLDB*, 1999, 542-553.

Chen, P., "The Entity-Relationship Model—Toward a Unified View of Data," *ACM Trans. on Database Syst.*, 1976, 1(1), 9-36.

Cook, W. R. et al., "Integrating Programming Languages & Databases: What's the Problem?" Draft at http://www.cs.utexas.edu/☐wcook/Drafts/2005/PLDBProblem.pdf, Oct. 2005, 1-18.

Dayal, U. et al., "On the Updatability of Relational Views," *International Conference on Very Large Data Bases (VLDB)*, 1978, 368-377.

Di Paola, R. A., "The Recursive Unsolvability of the Decision Problem for the Class of Definite Formulas," *J. ACM*, 1969, 16(2), 324-327.

Fagin, R. et al., "Data exchange: semantics and query answering," *Theor. Comput. Sci.*, 2005, 336, 89-124.

Fagin, R. et al., "Composing Schema Mappings: Second-Order Dependencies to the Rescue," *PODS*, Paris, France, 2004, 12 pages.

Foster, J. N. et al., "Combinators for Bi-Directional Tree Transformations: A Linguistic Approach to the View Update Problem," *POPL*, 2004/2005, article and slides, 1-75 & 37 pages.

Fowler, M., "Patterns of Enterprise Application Architecture" Addison-Wesley, Boston, MA, 2002, 533 pages.

Gottlob, G. et al., "Properties and Update Semantics of Consistent Views," *ACM Transactions on Database Systems*, 1988, 13(4), 486-524.

Grimes, S., "Object/Relational Reality Check," *Database Programming & Design (DBPD)*, Jul. 1998, 11(7), 8 pages.

Gupta, A. et al., "Maintenance of Materialized Views: Problems, Techniques, and Applications," *IEEE Data Eng. Bull.*, 1995, 18(2), 3-18.

Halevy, A., "Answering queries using views: A survey," *VLDB J.*, 2001, 10(4), 270-294.

IBM, "IBM Rational Data Architect," www.ibm.com/software/data/integration/rda/, downloaded 2007, 3 pages.

Keene, C., "Data Services for Next-Generation SOAs," *SOA WebServices Journal*, 2004, http://soa.sys-con.com/read/4723.htm, 4(12), 4 pages.

Keller, A. M. et al., "Persistence Software: Bridging Object-Oriented Programming and Relational Databases," *SIGMOD*, 1993, 1-6.

Kotidis, Y. et al., "Updates Through Views: A New Hope," *Intl. Conf on Data Engineering (ICDE)*, 2006, 1-12.

Krishnamurthy, V. et al., "Bringing Object-Relational Technology to Mainstream," *SIGMOD*, 1999, 513-514.

LLBLGen Pro, "LLBLGen Pro O/R Mapper," Generator. www.llblgen.com, downloaded 2007, 4 pages.

Microsoft Corp., "Microsoft BizTalk Server," www.microsoft.com/biztalk/, updated 2007, 3 pages.

Microsoft Corporation, "Common Language Runtime (CLR)," http://msdn2.microsoft.com/en-us/library/ms131047.asox, 2005, 6 pages.

Microsoft Corporation, "The LINQ Project," http://msdn.microsoft.com/library/en-us/dndotnet/html/linqprojectovw.asp, updated 2007, 3 pages.

Nash, A. et al., "Composition of Mappings Given by Embedded Dependencies," *PODS*, 2005, 12 pages.

Object Management Group, Inc., "Unified Modeling Language," http://www.uml.org/, 2005, 4 pages.

Oracle Technology Network, "Oracle TopLink," www.oracle.com/technology/products/ias_toplink/, downloaded 2007, 2 page.

Pierce, B. C., "The Weird World of Bi-Directional Programming," *ETAPS Invited Talk*, Slides at http://www.cis.upenn.edu/~bcpierce/papers/lensesetapsslideshttp://www.cis.upenn.edu/☐bcpierce/papers/lensesetapsslides.pdf, Mar. 2006, 140 pages.

Roth, M. et al., "XML Mapping Technology: Making Connections in an XML-Centric World," *IBM Systems J.*, 2006, 45(2), 389-409.

Segoufin, V., "Views and Queries: Determinacy and Rewriting," *PODS*, 2005, 12 pages.

Zhang, W. et al., "The Real Benefits of Object-Relational DB-Technology for Object-Oriented Software Development," *BNCOD*, 2001, 89-104.

Gupta, A. et al., "Materialized Views: Techniques, Implementations, and Applications," *The MIT Press*, 1999.

\* cited by examiner

| | | |
|---|---|---|
| SELECT o.Id, o.AccountNum<br>FROM ESalesOrders o<br>WHERE o IS OF ESalesOrder | = | SELECT SalesOrderId, AccountNum<br>FROM SSalesOrders<br>WHERE IsOnline = "true" | 1 |
| SELECT o.Id, o.AccountNum, o.Tax<br>FROM ESalesOrders o<br>WHERE o IS OF EStoreSalesOrder | = | SELECT SalesOrderId, AccountNum, Tax<br>FROM SSalesOrders<br>WHERE IsOnline = "false" | 2 |
| SELECT o.EOrder.Id, o.ESalesPerson.Id<br>FROM ESalesPersonOrders o | = | SELECT SalesOrderId, SalesPersonId<br>FROM SSalesOrders | 3 |
| SELECT p.Id, p.Bonus<br>FROM ESalesPersons p | = | SELECT SalesPersonId, Bonus<br>FROM SSalesPersons | 4 |
| SELECT p.Id, p.Title, p.HireDate<br>FROM ESalesPersons p | = | SELECT EmployeeId, Title, HireDate<br>FROM SEmployees | 5 |
| SELECT p.Id, p.Name,<br>p.Contact.Email, p.Contact.Phone<br>p | = | SELECT ContactId, Name, Email, Phone<br>FROM SContacts | 6 |

*Fig. 5*

Query views

```
ESalesOrders =                                                QV₁
SELECT
   CASE WHEN T.IsOnline = True
         THEN ESalesOrder(T.SalesOrderId, T.AccountNum)
         ELSE  EStoreSalesOrder(T.SalesOrderId,
                                T.AccountNum, T.Tax)
   END
FROM SSalesOrders AS T ESalesPersonOrders =                                          QV₂
SELECT ESalesPersonOrder(
       CreateRef(ESalesOrders, T.SalesOrderId),
       CreateRef(ESalesPersons, T.SalesPersonId))
FROM SSalesOrders AS T
```

Update views

```
SSalesOrders =                                                UV₁
SELECT o.Id, po.Id, o.AccountNum,
       TREAT(o AS EStoreSalesOrder).Tax AS Tax,
       CASE WHEN o IS OF ESalesOrder THEN TRUE ELSE FALSE END
       AS IsOnline
 FROM ESalesOrders AS o
 INNER JOIN ESalesPersonOrders AS po
 ON o.SalesOrderId = Key(po.EOrder).Id
```

Query views

```
ESalesPersons =                                               QV₃
SELECT  ESalesPerson(p.SalesPersonId , p.Bonus ,
                    e.Title, e.HireDate ,
                    c.Name , Contact(c.Email , c.Phone ))
FROM SSalesPersons AS p, SEmployees AS e, SContacts AS c
WHERE p.SalesPersonId = e.EmployeeId
AND e.EmployeeId = c.ContactId
```

Update views

```
SSalesPersons =                                               UV₂
SELECT p.Id, p.Bonus FROM ESalesPersons AS p SEmployees =                                                  UV₃
SELECT p.Id, p.Title, p.HireDate FROM ESalesPersons AS p SContacts =                                                   UV₄
SELECT  p.Id, p.Name, p.Contact.Email, p.Contact.Phone
FROM ESalesPersons AS p
```

*Fig. 6*

VIEW MAINTENANCE RULES FOR AN UPDATE PIPELINE OF AN OBJECT-RELATIONAL MAPPING (ORM) PLATFORM

BACKGROUND

Bridging applications and databases is a longstanding problem. In 1996, Carey and DeWitt outlined why many technologies, including object-oriented databases and persistent programming languages, did not gain wide acceptance due to limitations in query and update processing, transaction throughput, and scalability. They speculated that object-relational (O/R) databases would dominate in 2006. Indeed, DB2® and Oracle® database systems include a built-in object layer that uses a hardwired O/R mapping on top of a conventional relational engine. However, the O/R features offered by these systems appear to be rarely used for storing enterprise data, with the exception of multimedia and spatial data types. Among the reasons are data and vendor independence, the cost of migrating legacy databases, scale-out difficulties when business logic runs inside the database instead of the middle tier, and insufficient integration with programming languages.

Since mid 1990's, client-side data mapping layers have gained popularity, fueled by the growth of Internet applications. A core function of such a layer is to provide an updatable view that exposes a data model closely aligned with the application's data model, driven by an explicit mapping. Many commercial products and open source projects have emerged to offer these capabilities. Virtually every enterprise framework provides a client-side persistence layer (e.g., EJB in J2EE). Most packaged business applications, such as ERP and CRM applications, incorporate proprietary data access interfaces (e.g., BAPI in SAP R/3)

One widely used open source Object-Relational Mapping (ORM) framework for Java® is Hibernate®. It supports a number of inheritance mapping scenarios, optimistic concurrency control, and comprehensive object services. The latest release of Hibernate conforms to the EJB 3.0 standard, which includes the Java Persistence Query Language. On the commercial side, popular ORMs include Oracle TopLink® and LLBLGen®. The latter runs on the .NET platform. These and other ORMs are tightly coupled with the object models of their target programming languages.

BEA® recently introduced a new middleware product called the AquaLogic Data Services Platform® (ALDSP). It uses XML Schema for modeling application data. The XML data is assembled using XQuery from databases and web services. ALDSP's runtime supports queries over multiple data sources and performs client-side query optimization. The updates are performed as view updates on XQuery views. If an update does not have a unique translation, the developer needs to override the update logic using imperative code. ALDSP's programming surface is based on service data objects (SDO).

Today's client-side mapping layers offer widely varying degrees of capability, robustness, and total cost of ownership. Typically, the mapping between the application and database artifacts used by ORMs has vague semantics and drives case-by-case reasoning. A scenario-driven implementation limits the range of supported mappings and often yields a fragile runtime that is difficult to extend. Few data access solutions leverage data transformation techniques developed by the database community, and often rely on ad hoc solutions for query and update translation.

Database research has contributed many powerful techniques that can be leveraged for building persistence layers. And yet, there are significant gaps. Among the most critical ones is supporting updates through mappings. Compared to queries, updates are far more difficult to deal with as they need to preserve data consistency across mappings, may trigger business rules, and so on. Updates through database views are intrinsically hard: even for very simple views finding a unique update translation is rarely possible. As a consequence, commercial database systems and data access products offer very limited support for updatable views. Recently, researchers turned to alternative approaches, such as bidirectional transformations.

Traditionally, conceptual modeling has been limited to database and application design, reverse-engineering, and schema translation. Many design tools use UML. Only very recently conceptual modeling started penetrating industry-strength data mapping solutions. For example, the concept of entities and relationships surfaces both in ALDSP and EJB 3.0. ALDSP overlays E-R-style relationships on top of complex-typed XML data, while EJB 3.0 allows specifying relationships between objects using class annotations.

Schema mapping techniques are used in many data integration products, such as Microsoft® BizTalk Server®, IBM® Rational Data Architect®, and ETL® tools. These products allow developers to design data transformations or compile them from mappings to translate e-commerce messages or load data warehouses.

SUMMARY

A system, method, and computer readable media are provided for a database update pipeline. In one embodiment, the update pipeline is incorporated into a data access architecture for providing data services to applications, thereby bridging the gap between application data and data as persisted in databases. The update pipeline has the ability to translate changes made to object instances into data store change constructs, and carry those changes over to a data store. Such a pipeline can also advantageously perform the reverse operation, allowing applications to query using the database update pipeline, and receive materialized object instances. The update pipeline may comprise a variety of components, e.g., a change list generation component, an extraction component, a grouping component, a propagation component, an ordering component, and a completion component. In one embodiment, view maintenance rules are leveraged in the update pipeline. The rules may be tailored for a plurality of optimization levels. Further aspects and embodiments of the invention are illustrated in detail below.

BRIEF DESCRIPTION OF THE DRAWINGS

The systems and methods for a database update pipeline in accordance with the present invention are further described with reference to the accompanying drawings in which:

FIG. 5 illustrates mapping is represented in terms of queries on the entity schema and the relational schema.

FIG. 6 illustrates bidirectional views—the query and update views—generated by the mapping compiler for the mapping in FIG. 5.

DETAILED DESCRIPTION

Novel Data Access Architecture

Figure 1:
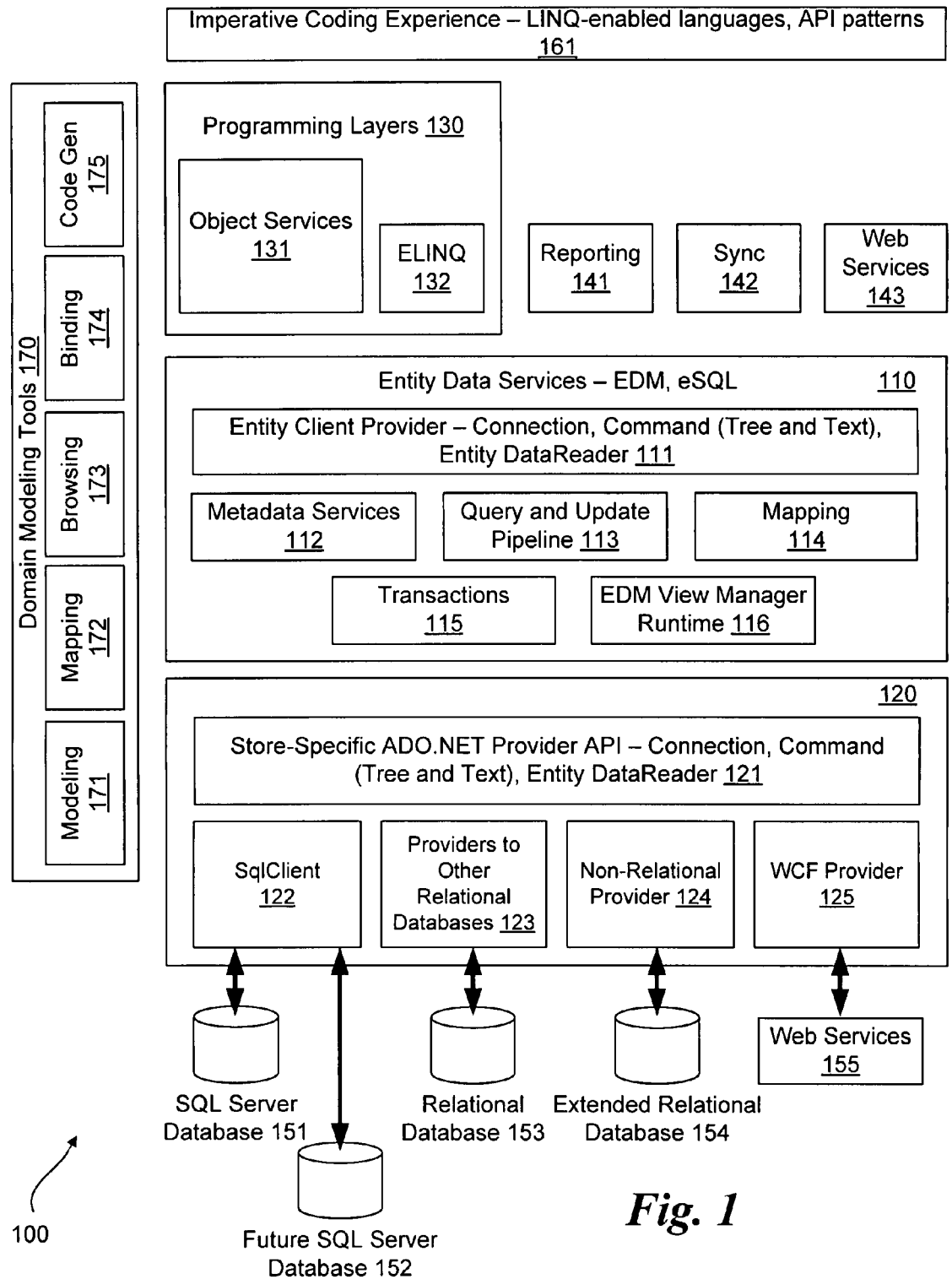
FIG. 1 illustrates an architecture of an exemplary Entity Framework as contemplated herein.

In one embodiment, the innovation may be implemented within and incorporate aspects of a novel data access architecture—an "Entity Framework"—as described in this section. An example of such an such an Entity Framework is the ADO.NET vNEXT® data access architecture developed by MICROSOFT® Corporation. The following is a general description of the ADO.NET vNEXT data access architecture along with many implementation-specific details which should not be considered necessary to practice the invention.

Overview

Traditional client-server applications relegate query and persistence operations on their data to database systems. The database system operates on data in the form of rows and tables, while the application operates on data in terms of higher-level programming language constructs (classes, structures etc.). The impedance mismatch in the data manipulation services between the application and the database tier was problematic even in traditional systems. With the advent of service-oriented architectures (SOA), application servers and multi-tier applications, the need for data access and manipulation services that are well-integrated with programming environments and can operate in any tier has increased tremendously.

Microsoft's ADO.NET Entity Framework is a platform for programming against data that raises the level of abstraction from the relational level to the conceptual (entity) level, and thereby significantly reduces the impedance mismatch for applications and data-centric services. Aspects of the Entity Framework, the overall system architecture, and the underlying technologies are described below.

Introduction

Modern applications require data management services in all tiers. They need to handle increasingly richer forms of data which includes not only structured business data (such as Customers and Orders), but also semi-structured and unstructured content such as email, calendars, files, and documents. These applications need to integrate data from multiple data sources as well as to collect, cleanse, transform and store this data to enable a more agile decision making process. Developers of these applications need data access, programming and development tools to increase their productivity. While relational databases have become the de facto store for most structured data, there tends to be a mismatch—the well-known impedance mismatch problem—between the data model (and capabilities) exposed by such databases, and the modeling capabilities needed by applications.

Two other factors also play an important part in enterprise system design. First, the data representation for applications tends to evolve differently from that of the underlying databases. Second, many systems are composed of disparate database back-ends with differing degrees of capability. The application logic in the mid-tier is responsible for data transformations that reconcile these differences and presenting a more uniform view of data. These data transformations quickly become complex. Implementing them, especially when the underlying data needs to be updatable, is a hard problem and adds complexity to the application. A significant portion of application development—up to 40% in some cases—is dedicated to writing custom data access logic to work around these problems.

The same problems exist, and are no less severe, for data-centric services. Conventional services such as query, updates, and transactions have been implemented at the logical schema (relational) level. However, the vast majority of newer services, such as replication and analysis, best operate on artifacts typically associated with a higher-level, conceptual data model. For example, SQL SERVER® Replication invented a structure called "logical record" to represent a limited form of entity. Similarly, SQL Server Reporting Services builds reports on top of an entity-like data model called semantic data model language (SDML). Each of these services has custom tools to define conceptual entities and map them down to relational tables—a Customer entity will therefore need to be defined and mapped one way for replication, another way for report building, yet another way for other analysis services and so on. As with applications, each service typically ends up building a custom solution to this problem, and consequently, there is code duplication and limited interoperability between these services.

Object-to-relational mapping (ORM) technologies such as HIBERNATE® and ORACLE TOPLINK® are a popular alternative to custom data access logic. The mappings between the database and applications are expressed in a custom structure, or via schema annotations. These custom structures may seem similar to a conceptual model; however, applications cannot program directly against this conceptual model. While the mappings provide a degree of independence between the database and the application, the problem of handling multiple applications with slightly differing views of the same data (e.g. consider two applications that want to look at different projections of a Customer entity), or of the needs of services which tend to be more dynamic (a priori class generation techniques do not work well for data services, since the underlying database may evolve quicker) are not well addressed by these solutions.

The ADO.NET Entity Framework is a platform for programming against data that significantly reduces the impedance mismatch for applications and data-centric services. It differs from other systems and solutions in at least the following respects:

1. The Entity Framework defines a rich conceptual data model (the Entity Data Model, or the EDM), and a new data manipulation language (Entity SQL) that operates on instances of this model. Like SQL, the EDM is value-based i.e. the EDM defines the structural aspects of entities, and not the behaviors (or methods).

2. This model is made concrete by a runtime that includes a middleware mapping engine supporting powerful bidirectional (EDM—Relational) mappings for queries and updates.

3. Applications and services may program directly against the value-based conceptual layer, or against programming-language-specific object abstractions that may be layered over the conceptual (entity) abstraction, providing ORM-like functionality. We believe a value-based EDM conceptual abstraction is a more flexible basis for sharing data among applications and data-centric services than objects.

4. Finally, the Entity Framework leverages Microsoft's new Language Integrated Query (LINQ) technologies that extend programming languages natively with query expressions to further reduce, and for some scenarios completely eliminate, the impedance mismatch for applications.

The ADO.NET Entity Framework can be incorporated into a larger framework such as the Microsoft .NET Framework.

The rest of this description of a data access architecture, in the context of an ADO.NET Entity Framework embodiment, is organized as follows. The "motivation" section provides additional motivation for the Entity Framework. The "Entity Framework" section presents the Entity Framework and the Entity Data Model. The "Programming Patterns" section describes programming patterns for the Entity Framework. The "Object Services" section outlines the Object Services module. The "Mapping" section focuses on the Mapping component of the Entity Framework, while the "Query Processing" and "Update Processing" sections explain how queries and updates are handled. The "Metadata" and "Tools" describe the metadata subsystem and the tools components of the Entity Framework.

Motivation

This section discusses why a higher level data modeling layer has become useful for applications and data-centric services.

Information Levels in Data Applications

Today's dominant information modeling methodologies for producing database designs factor an information model into four main levels: Physical, Logical (Relational), Conceptual, and Programming/Presentation.

The physical model describes how data is represented in physical resources such as memory, wire or disk. The vocabulary of concepts discussed at this layer includes record formats, file partitions and groups, heaps, and indexes. The physical model is typically invisible to the application—changes to the physical model should not impact application logic, but may impact application performance.

The logical data model is a complete and precise information model of the target domain. The relational model is the representation of choice for most logical data models. The concepts discussed at the logical level include tables, rows, primary-key/foreign-key constraints, and normalization. While normalization helps to achieve data consistency, increased concurrency, and better OLTP performance, it also introduces significant challenges for applications. Normalized data at the logical level is often too fragmented and application logic needs to assemble rows from multiple tables into higher level entities that more closely resemble the artifacts of the application domain.

The conceptual model captures the core information entities from the problem domain and their relationships. A well-known conceptual model is the Entity-Relationship Model introduced by Peter Chen in 1976. UML is a more recent example of a conceptual model. Most applications involve a conceptual design phase early in the application development lifecycle. Unfortunately, however, the conceptual data model diagrams stay "pinned to a wall" growing increasingly disjoint from the reality of the application implementation with time. An important goal of the Entity Framework is to make the conceptual data model (embodied by the Entity Data Model described in the next section) a concrete, programmable abstraction of the data platform.

The programming/presentation model describes how the entities and relationships of the conceptual model need to be manifested (presented) in different forms based on the task at hand. Some entities need to be transformed into programming language objects to implement application business logic; others need to be transformed into XML streams for web service invocations; still others need to be transformed into in-memory structures such as lists or dictionaries for the purposes of user-interface data binding. Naturally, there is no universal programming model or presentation form; thus, applications need flexible mechanisms to transform entities into the various presentation forms.

Most applications and data-centric services would like to reason in terms of high-level concepts such as an Order, not about the several tables that an order may be normalized over in a relational database schema. An order may manifest itself at the presentation/programming level as a class instance in Visual Basic or C# encapsulating the state and logic associated with the order, or as an XML stream for communicating with a web service. There is no one proper presentation model; the real value is in providing a concrete conceptual model, and then being able to use that model as the basis for flexible mappings to and from various presentation models and other higher level data services.

Evolution of Applications and Services

Data-based applications 10-20 years ago were typically structured as data monoliths; closed systems with logic factored by verb-object functions (e.g., create-order, update-customer) that interacted with a database system at the logical schema level. Several significant trends have shaped the way that modern data-based applications are factored and deployed today. Chief among these are object-oriented factoring, service level application composition, and higher level data-centric services. Conceptual entities are an important part of today's applications. These entities must be mapped to a variety of representations and bound to a variety of services. There is no one correct representation or service binding: XML, Relational and Object representations are all important, but no single one suffices for all applications. There is a need, therefore, for a framework that supports a higher-level data modeling layer, and also allows multiple presentation layers to be plugged in—the Entity Framework aims to fulfill these requirements.

Data-centric services have also been evolving in a similar fashion. The services provided by a "data platform" 20 years ago were minimal and focused around the logical schema in an RDBMS. These services included query and update, atomic transactions, and bulk operations such as backup and load/extract.

SQL Server itself is evolving from a traditional RDBMS to a complete data platform that provides a number of high value data-centric services over entities realized at the conceptual schema level. Several higher-level data-centric services in the SQL Server product—Replication, Report Builder to name just a couple—are increasingly delivering their services at the conceptual schema level. Currently, each of these services has a separate tool to describe conceptual entities and map them down to the underlying logical schema level. One goal of the Entity Framework is to provide a common, higher-level conceptual abstraction that all of these services can share.

The Entity Framework

Microsoft's ADO.NET framework that existed prior to the Entity Framework described herein was a data-access technology that enabled applications to connect to data stores and manipulate data contained in them in various ways. It was part of the Microsoft .NET Framework and it was highly integrated with the rest of the .NET Framework class library. The prior ADO.NET framework had two major parts: providers and services. ADO.NET providers are the components that know how to talk to specific data stores. Providers are composed of three core pieces of functionality: connections manage access to the underlying data source; commands represent a command (query, procedure call, etc.) to be executed against the data source; and data readers represent the result of command execution. ADO.NET services include provider-neutral components such as DataSet to enable offline data programming scenarios. (A DataSet is a memory-resident representation of data that provides a consistent relational programming model regardless of the data source.)

Entity Framework—Overview

The ADO .NET Entity Framework builds on the pre-existing existing ADO.NET provider model, and adds a variety of novel functionality, for example:

1. A new conceptual data model, the Entity Data Model (EDM), to help model conceptual schemas.

2. A new data manipulation language (DML), Entity SQL, to manipulate instances of the EDM, and a programmatic representation of a query (canonical command trees) to communicate with different providers.

3. The ability to define mappings between the conceptual schema and the logical schemas.

4. An ADO.NET provider programming model against the conceptual schema.

5. An object services layer to provide ORM-like functionality.

6. Integration with LINQ technology to make it easy to program against data as objects from NET languages.

The Entity Data Model

The Entity Data Model (EDM) is useful for developing rich data-centric applications. It extends the classic relational model with concepts from the E-R domain. Organizational concepts in the EDM include entities and relationships. Entities represent top-level items with identity, while Relationships are used to relate (or, describe relationships between) two or more entities.

The EDM is value-based like the relational model (and SQL), rather than object/reference-based like C# (CLR). Several object programming models can be easily layered on top of the EDM. Similarly, the EDM can map to one or more DBMS implementations for persistence.

The EDM and Entity SQL represent a richer data model and data manipulation language for a data platform and are intended to enable applications such as CRM and ERP, data-intensive services such as Reporting, Business Intelligence, Replication and Synchronization, and data-intensive applications to model and manipulate data at a level of structure and semantics that is closer to their needs. We now discuss various concepts pertaining to the EDM.

EDM Types

An EntityType describes the structure of an entity. An entity may have zero or more properties (attributes, fields) that describe the structure of the entity. Additionally, an entity type must define a key—a set of properties whose values uniquely identify the entity instance within a collection of entities. An EntityType may derive from (or subtype) another entity type—the EDM supports a single inheritance model. The properties of an entity may be simple or complex types. A SimpleType represents scalar (or atomic) types (e.g., integer, string), while a ComplexType represents structured properties (e.g., an Address). A ComplexType is composed of zero or more properties, which may themselves be scalar or complex type properties. A RelationshipType describes relationships between two (or more) entity types. EDM Schemas provide a grouping mechanism for types—types must be defined in a schema. The namespace of the schema combined with the type name uniquely identifies the specific type.

EDM Instance Model

Entity instances (or just entities) are logically contained within an EntitySet. An EntitySet is a homogeneous collection of entities, i.e., all entities in an EntitySet must be of the same (or derived) EntityType. An EntitySet is conceptually similar to a database table, while an entity is similar to a row of a table. An entity instance must belong to exactly one entity set. In a similar fashion, relationship instances are logically contained within a RelationshipSet. The definition of a RelationshipSet scopes the relationship. That is, it identifies the EntitySets that hold instances of the entity types that participate in the relationship. A RelationshipSet is conceptually similar to a link-table in a database. SimpleTypes and ComplexTypes can only be instantiated as properties of an EntityType. An EntityContainer is a logical grouping of EntitySets and RelationshipSets—akin to how a Schema is a grouping mechanism for EDM types.

An Example EDM Schema

A sample EDM schema is shown below:

```xml
<?xml version="1.0" encoding="utf-8"?>
<Schema Namespace="AdventureWorks" Alias="Self" ...>
    <EntityContainer Name="AdventureWorksContainer">
        <EntitySet Name="ESalesOrders"
                EntityType="Self.ESalesOrder" />
        <EntitySet Name="ESalesPersons"
                EntityType="Self.ESalesPerson" />
        <AssociationSet Name="ESalesPersonOrders"
                Association="Self.ESalesPersonOrder">
            <End Role="ESalesPerson"
                EntitySet="ESalesPersons" />
            <End Role="EOrder" EntitySet="ESalesOrders" />
        </AssociationSet>
    </EntityContainer>
    <!-- Sales Order Type Hierarchy-->
    <EntityType Name="ESalesOrder" Key="Id">
        <Property Name="Id" Type="Int32"
                Nullable="false" />
        <Property Name="AccountNum" Type="String"
                MaxLength="15" />
    </EntityType>
    <EntityType Name="EStoreSalesOrder"
                BaseType="Self.ESalesOrder">
        <Property Name="Tax" Type="Decimal"
                Precision="28" Scale="4" />
    </EntityType>
    <!-- Person EntityType -->
    <EntityType Name="ESalesPerson" Key="Id">
        <!-- Properties from SSalesPersons table-->
        <Property Name="Id" Type="Int32"
                Nullable="false" />
        <Property Name="Bonus" Type="Decimal"
                Precision="28" Scale="4" />
        <!-- Properties from SEmployees table-->
        <Property Name="Title" Type="String"
                MaxLength="50" />
        <Property Name="HireDate" Type="DateTime" />
        <!-- Properties from the SContacts table-->
        <Property Name="Name" Type="String"
                MaxLength="50" />
```

-continued

```
    <Property Name="Contact" Type="Self.ContactInfo"
        Nullable="false" />
</EntityType>
<ComplexType Name="ContactInfo">
    <Property Name="Email" Type="String"
        MaxLength="50" />
    <Property Name="Phone" Type="String"
        MaxLength="25" />
</ComplexType>
<Association Name="ESalesPersonOrder">
    <End Role="EOrder" Type="Self.ESalesOrder"
        Multiplicity="*" />
    <End Role="ESalesPerson" Multiplicity="1"
        Type="Self.ESalesPerson" />
</Association>
</Schema>
```

High-Level Architecture

This section outlines the architecture of the ADO.NET Entity Framework. Its main functional components are illustrated in FIG. 1 and comprise the following:

Data source-specific providers. The Entity Framework 100 builds on the ADO.NET data provider model. There are specific providers 122-125 for several data sources such as SQL Server 151, 152, relational sources 153, non-relational 154, and Web services 155 sources. The providers 122-125 can be called from a store-specific ADO.NET Provider API 121.

EntityClient provider. The EntityClient provider 111 represents a concrete conceptual programming layer. It is a new, value-based data provider where data is accessed in terms of EDM entities and relationships and is queried/updated using an entity-based SQL language (Entity SQL). The EntityClient provider 111 forms part of an Entity Data Services 110 package that may also include metadata services 112, a query and update pipeline 113 (further illustrated in the section below entitled "Further Aspects and Embodiments"), transactions support 115, a view manager runtime 116, and a view mapping subsystem 114 that supports updatable EDM views over flat relational tables. The mapping between tables and entities is specified declaratively via a mapping specification language.

Object Services and other Programming Layers. The Object Services component 131 of the Entity Framework 100 provides a rich object abstraction over entities, a rich set of services over these objects, and allows applications to program in an imperative coding experience 161 using familiar programming language constructs. This component provides state management services for objects (including change tracking, identity resolution), supports services for navigating and loading objects and relationships, supports queries via LINQ and Entity SQL using components such as ELINQ 132, and allows objects to be updated and persisted.

The Entity Framework allows multiple programming layers akin to 130 to be plugged onto the value-based entity data services layer 110 exposed by the EntityClient provider 111. The Object Services 130 component is one such programming layer that surfaces CLR objects, and provides ORM-like functionality.

The Metadata services 112 component manages metadata for the design time and runtime needs of the Entity Framework 100, and applications over the Entity Framework. All metadata associated with EDM concepts (entities, relationships, EntitySets, RelationshipSets), store concepts (tables, columns, constraints), and mapping concepts are exposed via metadata interfaces. The metadata component 112 also serves as a link between the domain modeling tools which support model-driven application design.

Design and Metadata Tools. The Entity Framework 100 integrates with domain designers 170 to enable model-driven application development. The tools include EDM design tools, modeling tools, 171, mapping design tools 172, browsing design tools 173, binding design tools 174, code generation tools 175, and query modelers.

Services. Rich data-centric services such as Reporting 141, Synchronization 142, Web Services 143 and Business Analysis can be built using the Entity Framework 100.

Programming Patterns

The ADO.NET Entity Framework together with LINQ increases application developer productivity by significantly reducing the impedance mismatch between application code and data. In this section we describe the evolution in data access programming patterns at the logical, conceptual and object abstraction layers.

Figure 2:
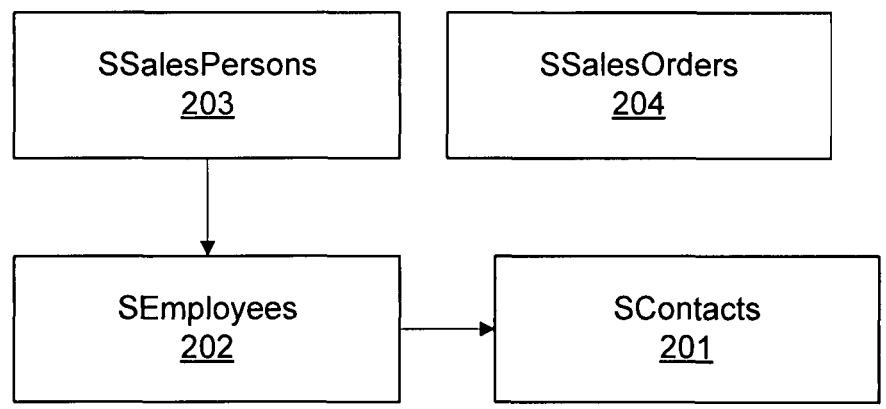
FIG. 2 illustrates an exemplary relational schema.

Consider the following relational schema fragment based on the sample AdventureWorks database. This database consists of SContacts 201, SEmployees 202, SSalesPersons 203, and SSalesOrders 204 tables, which may follow a relational schema such as that illustrated in FIG. 2.

SContacts (ContactId, Name, Email, Phone)
SEmployees (EmployeeId, Title, HireDate)
SSalesPersons (SalesPersonId, Bonus)
SSalesorders (Salesorderod, SalesPersonId)

Consider an application code fragment to obtain the name and hired date of salespeople who were hired prior to some date (shown below). There are four main shortcomings in this code fragment that have little to do with the business question that needs to be answered. First, even though the query can be stated in English very succinctly, the SQL statement is quite verbose and requires the developer to be aware of the normalized relational schema to formulate the multi-table join required to collect the appropriate columns from the SContacts, SEmployees, and SSalesPerson tables. Additionally, any change to the underlying database schemas will require corresponding changes in the code fragment below. Second, the user has to define an explicit connection to the data source. Third, since the results returned are not strongly typed, any reference to non-existing columns names will be caught only after the query has executed. Fourth, the SQL statement is a string property to the Command API and any errors in its formulation will be only caught at execution time. While this code is written using ADO.NET 2.0, the code pattern and its shortcomings applies to any other relational data access API such as ODBC, JDBC, or OLE-DB.

```
void EmpsByDate (DateTime date) {
    using( SqlConnection con =
        new SqlConnection (CONN_STRING) ) {
        con.Open( );
        SqlCommand cmd = con.CreateCommand( );
        cmd.CommandText = @"
        SELECT SalesPersonID, FirstName, HireDate
        FROM SSalesPersons sp
            INNER JOIN SEmployees e
            ON sp.SalesPersonID = e.EmployeeID
            INNER JOIN SContacts c
            ON e.EmployeeID = c.ContactID
        WHERE e.HireDate < @date";
        cmd.Parameters.AddWithValue("@date",date);
        DbDataReader r = cmd.ExecuteReader( );
        while(r.Read( )) {
            Console.WriteLine ("{0:d}:\t{1}",
                r["HireDate"], r["FirstName"]);
}}}
```

Figure 3:
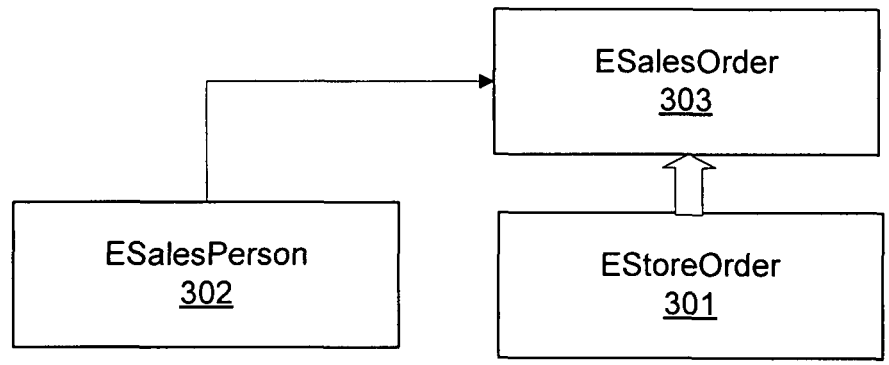
FIG. 3 illustrates an exemplary Entity Data Model (EDM) schema.

The sample relational schema can be captured at the conceptual level via an EDM schema, as illustrated in FIG. 3. It defines an entity type ESalesPerson 302 that abstracts out the fragmentation of SContacts 201, SEmployees 202, and SSalesPersons 203 tables. It also captures the inheritance relationship between the EStoreOrder 301 and ESalesOrder 303 entity types.

The equivalent program at the conceptual layer is written as follows:

```
void EmpsByDate (DateTime date) {
    using( EntityConnection con =
        new EntityConnection (CONN_STRING) ) {
        con.Open( );
        EntityCommand cmd = con.CreateCommand( );
        cmd.CommandText = @"
            SELECT VALUE sp
            FROM ESalesPersons sp
            WHERE sp.HireDate < @date";
        cmd.Parameters.AddWithValue ("date",
            date);
        DbDataReader r = cmd.ExecuteReader(
            CommandBehavior. SequentialAccess);
        while (r.Read( )) {
            Console.WriteLine("{0:d}:\t{1}",
                r["HireDate"]], r["FirstName"])
}}}
```

The SQL statement has been considerably simplified—the user no longer has to know about the precise database layout. Furthermore, the application logic can be isolated from changes to the underlying database schema. However, this fragment is still string-based, still does not get the benefits of programming language type-checking, and returns weakly typed results.

By adding a thin object wrapper around entities and using the Language Integrated Query (LINQ) extensions in C#, one can rewrite the equivalent function with no impedance mismatch as follows:

```
void EmpsByDate (DateTime date) {
    using (AdventureWorksDB aw =
        new AdventureWorksDB ( )) {
        var people = from p in aw.SalesPersons
            where p.HireDate < date
            select p;
        foreach (Salesperson p in people) {
            Console.WriteLine("{0:d}\t{1}",
                p.HireDate, p.FirstName);
}}}
```

The query is simple; the application is (largely) isolated from changes to the underlying database schema; and the query is fully type-checked by the C# compiler. In addition to queries, one can interact with objects and perform regular Create, Read, Update and Delete (CRUD) operations on the objects. Examples of these are described in the Update Processing section.

Object Services

The Object Services component is a programming/presentation layer over the conceptual (entity) layer. It houses several components that facilitate the interaction between the programming language and the value-based conceptual layer entities. We expect one object service to exist per programming language runtime (e.g., .NET, Java). If it is designed to support the .NET CLR, programs in any .NET language can interact with the Entity Framework. Object Services is composed of the following major components:

The ObjectContext class houses the database connection, metadata workspace, object state manager, and object materializer. This class includes an object query interface ObjectQuery<T> to enable the formulation of queries in either Entity SQL or LINQ syntax, and returns strongly-typed object results as an ObjectCollection<T>. The ObjectContext also exposes query and update (i.e., SaveChanges) object-level interfaces between the programming language layer and the conceptual layer. The Object state manager has three main functions: (a) cache query results, providing identity resolution, and managing policies to merge objects from overlapping query results, (b) track in-memory changes, and (c) construct the change list input to the update processing infrastructure (see Sec. 8). The object state manager maintains the state of each entity in the cache—detached (from the cache), added, unchanged, modified, and deleted—and tracks their state transitions. The Object materializer performs the transformations during query and update between entity values from the conceptual layer and the corresponding CLR objects.

Mapping

The backbone of a general-purpose data access layer such as the ADO.NET Entity Framework is a mapping that establishes a relationship between the application data and the data stored in the database. An application queries and updates data at the object or conceptual level and these operations are translated to the store via the mapping. There are a number of technical challenges that have to be addressed by any mapping solution. It is relatively straightforward to build an ORM that uses a one-to-one mapping to expose each row in a relational table as an object, especially if no declarative data manipulation is required. However, as more complex mappings, set-based operations, performance, multi-DBMS-vendor support, and other requirements weigh in, ad hoc solutions quickly grow out of hand.

Problem: Updates via Mappings

The problem of accessing data via mappings can be modeled in terms of "views", i.e., the objects/entities in the client layer can be considered as rich views over the table rows. However, it is well known that only a limited class of views is updateable, e.g., commercial database systems do not allow updates to multiple tables in views containing joins or unions. Finding a unique update translation over even quite simple views is rarely possible due to the intrinsic under-specification of the update behavior by a view. Research has shown that teasing out the update semantics from views is hard and can require significant user expertise. However, for mapping-driven data access, it is advantageous that there exists a well-defined translation of every update to the view.

Furthermore, in mapping-driven scenarios, the updatability requirement goes beyond a single view. For example, a business application that manipulates Customer and Order entities effectively performs operations against two views. Sometimes a consistent application state can only be achieved by updating several views simultaneously. Case-by-case translation of such updates may yield a combinatorial explosion of the update logic. Delegating its implementation to application developers is unsatisfactory because it requires them to manually tackle one of the most complicated parts of data access.

The ADO.NET Mapping Approach

The ADO.NET Entity Framework supports an innovative mapping architecture that aims to address the above challenges. It exploits the following ideas:

1. Specification: Mappings are specified using a declarative language that has well-defined semantics and puts a wide range of mapping scenarios within reach of non-expert users.

2. Compilation: Mappings are compiled into bidirectional views, called query and update views, that drive query and update processing in the runtime engine.

3. Execution: Update translation is done using a general mechanism that leverages materialized view maintenance, a robust database technology. Query translation uses view unfolding.

The new mapping architecture enables building a powerful stack of mapping-driven technologies in a principled, future-proof way. Moreover, it opens up interesting research directions of immediate practical relevance. The following subsections illustrate the specification and compilation of mappings. Execution is considered in the Query Processing and Update Processing sections, below.

Specification of Mappings

A mapping is specified using a set of mapping fragments. Each mapping fragment is a constraint of the form $Q_{Entities}=Q_{Tables}$ where $Q_{Entities}$ is a query over the entity schema (on the application side) and $Q_{Tables}$ is a query over the database schema (on the store side). A mapping fragment describes how a portion of entity data corresponds to a portion of relational data. That is, a mapping fragment is an elementary unit of specification that can be understood independently of other fragments.

Figure 4:
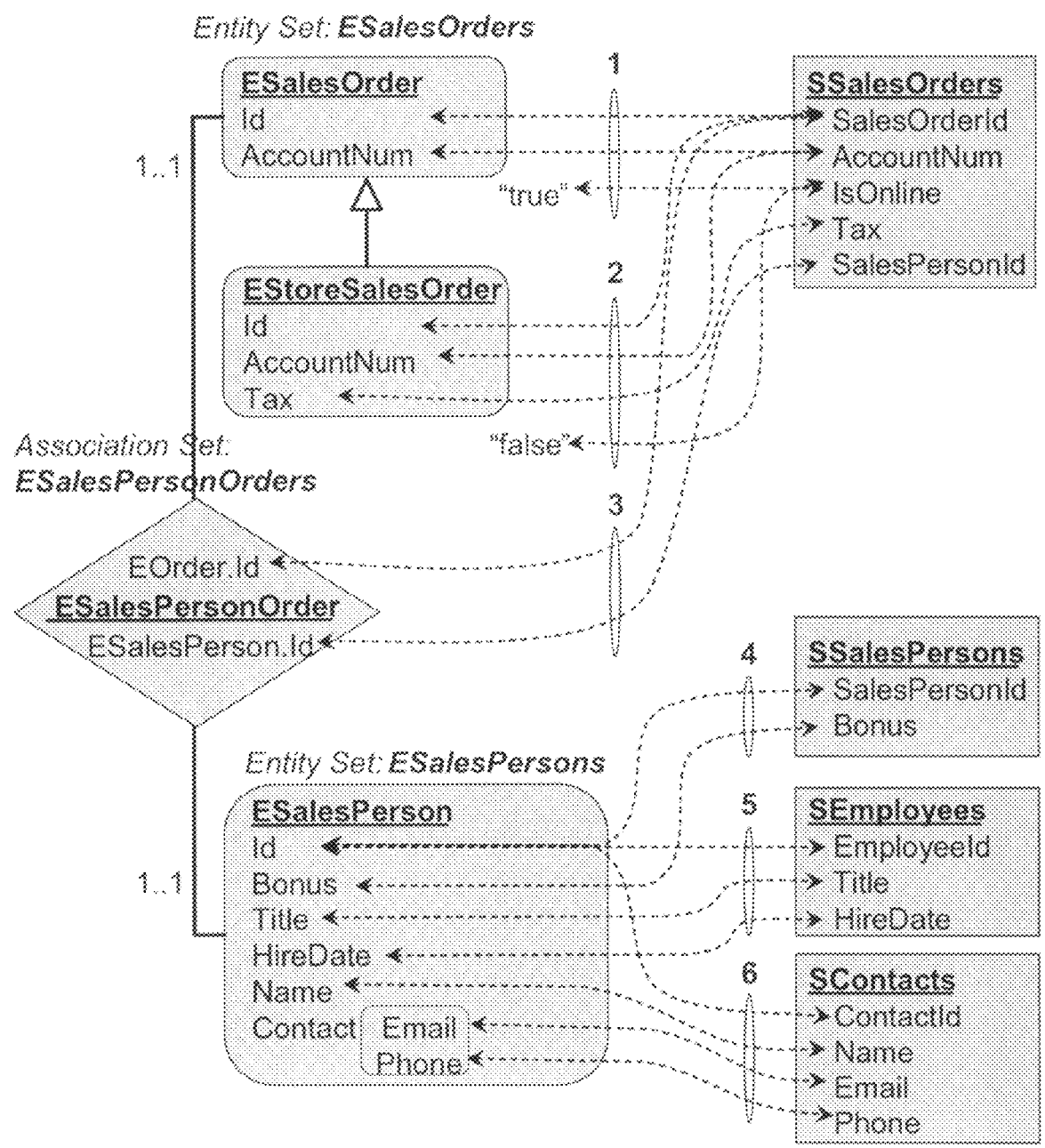
FIG. 4 illustrates a mapping between and entity schema (left) and a database schema (right).

To illustrate, consider the sample mapping scenario in FIG. 4. FIG. 4 illustrates a mapping between and entity schema (left) and a database schema (right). The mapping can be defined using an XML file or a graphical tool. The entity schema corresponds to the one in the Entity Data Model section herein. On the store side there are four tables, SSalesOrders, SSalesPersons, SEmployees, and SContacts.

The mapping is represented in terms of queries on the entity schema and the relational schema as shown in FIG. 5.

In FIG. 5, Fragment 1 says that the set of (Id, AccountNum) values for all entities of exact type ESalesOrder in ESalesOrders is identical to the set of (SalesOrderId, AccountNum) values retrieved from the SSalesOrders table for which IsOnline is true. Fragment 2 is similar. Fragment 3 maps the association set ESalesPersonOrders to the SSalesOrders table and says that each association entry corresponds to the primary key, foreign key pair for each row in this table. Fragments 4, 5, and 6 say that the entities in the ESalesPersons entity set are split across three tables SSalesPersons, SContacts, SEmployees.

Bidirectional Views

The mappings are compiled into bidirectional Entity SQL views that drive the runtime. The query views express entities in terms of tables, while the update views express tables in terms of entities.

Update views may be somewhat counterintuitive because they specify persistent data in terms of virtual constructs, but as we show later, they can be leveraged for supporting updates in an elegant way. The generated views 'respect' the mapping in a well-defined sense and have the following properties (note that the presentation is slightly simplified—in particular, the persistent state is not completely determined by the virtual state):

Entities=QueryViews(Tables)
Tables=UpdateViews(Entities)
Entities=QueryViews(UpdateViews(Entities))

The last condition is the roundtripping criterion, which ensures that all entity data can be persisted and reassembled from the database in a lossless fashion. The mapping compiler included in the Entity Framework guarantees that the generated views satisfy the roundtripping criterion. It raises an error if no such views can be produced from the input mapping.

FIG. 6 shows the bidirectional views—the query and update views—generated by the mapping compiler for the mapping in FIG. 5. In general, the views are significantly more complex than the input mapping, as they explicitly specify the required data transformations. For example, in $QV_1$ the ESalesOrders entity set is constructed from the SSalesOrders table so that either an ESalesOrder or an EStoreSalesOrder is instantiated depending on whether or not the IsOnline flag is true. To reassemble the ESalesPersons entity set from the relational tables, one needs to perform a join between SSalesPersons, SEmployees, and SContacts tables ($QV_3$).

Writing query and update views by hand that satisfy the roundtripping criterion is tricky and requires significant database expertise; therefore, present embodiments of the Entity Framework only accept the views produced by the built-in mapping compiler, although accepting views produced by other compilers or by hand is certainly plausible in alternative embodiments.

Mapping Compiler

The Entity Framework contains a mapping compiler that generates the query and update views from the EDM schema, the store schema, and the mapping (the metadata artifacts are discussed in the Metadata section herein). These views are consumed by the query and update pipelines. The compiler can be invoked either at design time or at runtime when the first query is executed against the EDM schema. The view generation algorithms used in the compiler are based on the answering-queries-using-views techniques for exact rewritings.

Query Processing

Query Languages

The Entity Framework is designed to work with multiple query languages. We describe Entity SQL and LINQ embodiments in more detail herein, understanding that the same or similar principles can be extended to other embodiments.

Entity SQL

Entity SQL is a derivative of SQL designed to query and manipulate EDM instances. Entity SQL extends standard SQL in the following ways.

1. Native support for EDM constructs (entities, relationships, complex types etc.): constructors, member accessors, type interrogation, relationship navigation, nest/unnest etc.

2. Namespaces. Entity SQL uses namespaces as a grouping construct for types and functions (similar to XQuery and other programming languages).

3. Extensible functions. Entity SQL supports no built-in functions. All functions (min, max, substring, etc.) are defined externally in a namespace, and imported into a query, usually from the underlying store.

4. More orthogonal treatment of sub-queries and other constructs as compared to SQL.

The Entity Framework supports Entity SQL as the query language at the EntityClient provider layer, and in the Object Services component. A sample Entity SQL query is shown in the Programming Patterns section herein.

Language Integrated Query (LINQ)

Language-integrated query, or LINQ, is an innovation in .NET programming languages that introduces query-related constructs to mainstream programming languages such as C# and Visual Basic. The query expressions are not processed by an external tool or language pre-processor but instead are first-class expressions of the languages themselves. LINQ allows query expressions to benefit from the rich metadata, compile-time syntax checking, static typing and IntelliSense that was previously available only to imperative code. LINQ defines a set of general-purpose standard query operators that allow traversal, filter, join, projection, sorting and grouping operations to be expressed in a direct yet declarative way in any .NET-based programming language. .NET Languages such as Visual Basic and C# also support query comprehensions—language syntax extensions that leverage the standard query operators. An example query using LINQ in C# is shown in the Programming Patterns section herein.

Canonical Command Trees

Canonical Command Trees—more simply, command trees—are the programmatic (tree) representation of all queries in the Entity Framework. Queries expressed via Entity SQL or LINQ are first parsed and converted into command trees; all subsequent processing is performed on the command trees. The Entity Framework also allows queries to be dynamically constructed (or edited) via command tree construction/edit APIs. Command trees may represent queries, inserts, updates, deletes, and procedure calls. A command tree is composed of one or more Expressions. An Expression simply represents some computation—the Entity Framework provides a variety of expressions including constants, parameters, arithmetic operations, relational operations (projection, filter, joins etc.), function calls and so on. Finally, command trees are used as the means of communication for queries between the EntityClient provider and the underlying store-specific provider.

Query Pipeline

Query execution in the Entity Framework is delegated to the data stores. The query processing infrastructure of the Entity Framework is responsible for breaking down an Entity SQL or LINQ query into one or more elementary, relational-only queries that can be evaluated by the underlying store, along with additional assembly information, which is used to reshape the flat results of the simpler queries into the richer EDM structures.

The Entity Framework assumes that stores must support capabilities similar to that of SQL Server 2000. Queries are broken down into simpler flat-relational queries that fit this profile. Alternative embodiments of the Entity Framework may allow stores to take on larger parts of query processing.

A typical query is processed as follows.

Syntax and Semantic Analysis. An Entity SQL query is first parsed and semantically analyzed using information from the Metadata services component. LINQ queries are parsed and analyzed as part of the appropriate language compiler.

Conversion to a Canonical Command Tree. The query is now converted into a command tree, regardless of how it was originally expressed, and validated.

Mapping View Unfolding. Queries in the Entity Framework target the conceptual (EDM) schemas. These queries must be translated to reference the underlying database tables and views instead. This process—referred to as mapping view unfolding—is analogous to the view unfolding mechanism in database systems. The mappings between the EDM schema and the database schema are compiled into query and update views. The query view is then unfolded in the user query—the query now targets the database tables and views.

Structured Type Elimination. All references to structured types are now eliminated from the query, and added to the reassembly information (to guide result assembly). This includes references to type constructors, member accessors, type interrogation expressions.

Projection Pruning. The query is analyzed, and unreferenced expressions in the query are eliminated.

Nest Pull-up. Any nesting operations (constructing nested collections) in the query are pushed up to the root of the query tree over a sub-tree containing only flat relational operators. Typically, the nesting operation is transformed into a left outer join (or an outer apply), and the flat results from the ensuing query are then reassembled (see Result Assembly below) into the appropriate results.

Transformations. A set of heuristic transformations are applied to simplify the query. These include filter push-downs, apply to join conversions, case expression folding, etc. Redundant joins (self-joins, primary-key, foreign-key joins) are eliminated at this stage. Note that the query processing infrastructure here does not perform any cost-based optimization.

Translation into Provider-Specific Commands. The query (i.e., command tree) is now handed off to providers to produce a provider-specific command, possibly in the providers' native SQL dialect. We refer to this step as SQLGen.

Execution. The provider commands are executed.

Result Assembly. The results (DataReaders) from the providers are then reshaped into the appropriate form using the assembly information gathered earlier, and a single DataReader is returned to the caller.

Materialization. For queries issued via the Object Services component, the results are then materialized into the appropriate programming language objects.

SQLGen

As mentioned in the previous section, query execution may be delegated to the underlying store. The query must first be translated into a form that is appropriate for the store. However, different stores support different dialects of SQL, and it is infeasible for the Entity Framework to natively support all of them. The query pipeline hands over a query in the form of a command tree to the store provider. The store provider must translate the command tree into a native command. This is usually accomplished by translating the command tree into the provider's native SQL dialect—hence the term SQLGen for this phase. The resulting command can then be executed to produce the relevant results. In addition to working against various versions of SQL Server, the Entity Framework may be integrated with various third-party ADO.NET providers for DB2, Oracle, and MySQL, and so forth.

Update Processing

This section describes how update processing is performed in the ADO.NET Entity Framework. There are two phases to update processing, compile time and runtime. In the Bidirectional Views section provided herein, we described the process of compiling the mapping specification into a collection of view expressions. This section describes how these view expressions are exploited at runtime to translate the object modifications performed at the object layer (or Entity SQL DML updates at the EDM layer) into equivalent SQL updates at the relational layer.

Updates via View Maintenance

One of the insights exploited in the ADO.NET mapping architecture is that materialized view maintenance algorithms can be leveraged to propagate updates through bidirectional views. This process is illustrated in FIG. 7.

Figure 7:
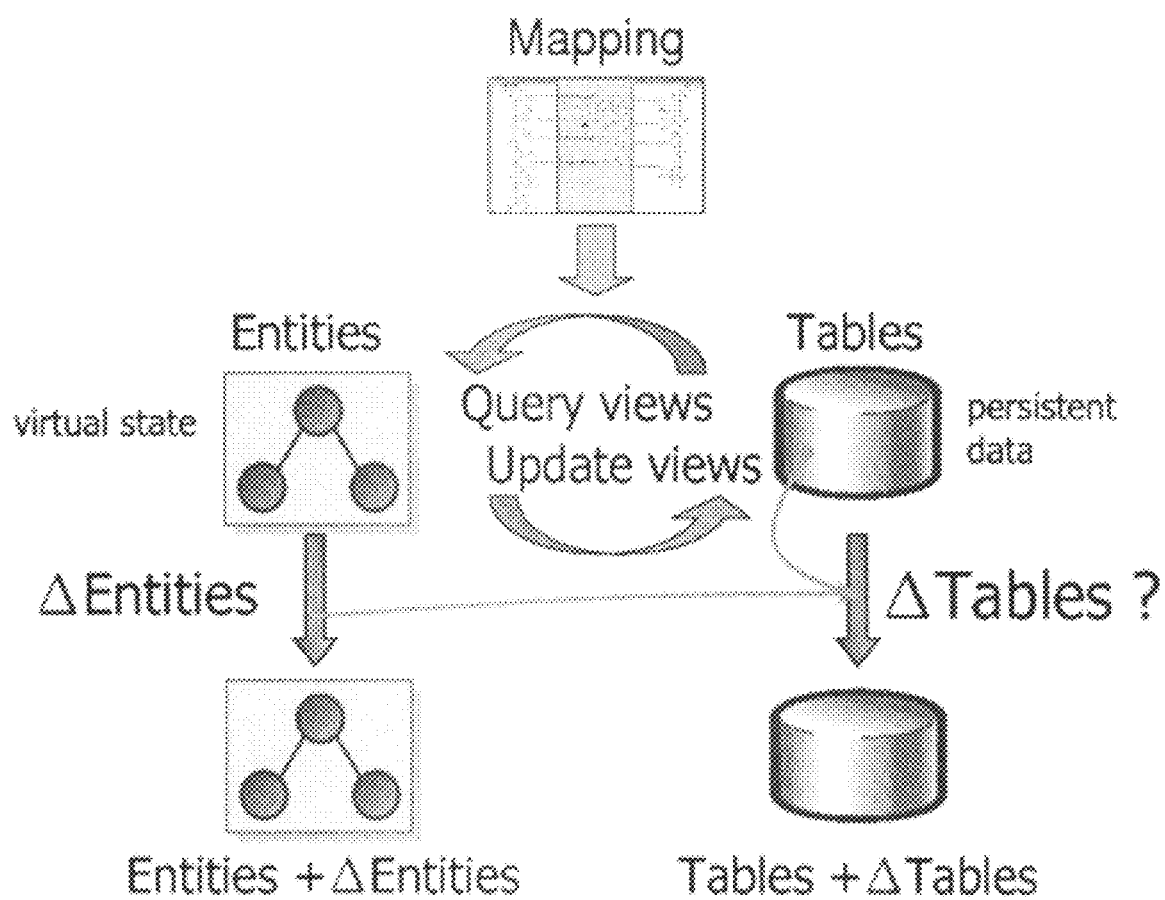
FIG. 7 illustrates a process for leveraging materialized view maintenance algorithms to propagate updates through bidirectional views.

Tables inside a database, as illustrated on the right hand side of FIG. 7, hold persistent data. An EntityContainer, as illustrated on the left side of FIG. 7, represents a virtual state of this persistent data since typically only a tiny fraction of the entities in the EntitySets are materialized on the client. The goal is to translate an update ΔEntities on the state of Entities into an update ΔTables on the persistent state of Tables. This process is referred to as incremental view maintenance, because the update is performed based on an update ΔEntities representing the changed aspects of an entity.

This can be done using the following two steps:
1. View Maintenance:
ΔTables=ΔUpdateViews(Entities, ΔEntities)
2. View Unfolding:
ΔTables=ΔUpdateViews (QueryViews(Tables), ΔEntities)

In Step 1, view maintenance algorithms are applied to update views. This produces a set of delta expressions, ΔUpdateViews, which tell us how to obtain ΔTables from ΔEntities and a snapshot of Entities. Since the latter is not fully materialized on the client, in Step 2 view unfolding is used to combine the delta expressions with query views. Together, these steps generate an expression that takes as input the initial database state and the update to entities, and computes the update to the database.

This approach yields a clean, uniform algorithm that works for both object-at-a-time and set-based updates (i.e., those expressed using data manipulation statements), and leverages robust database technology. In practice, Step 1 is often sufficient for update translation since many updates do not directly depend on the current database state; in those situations we have ΔTables=ΔUpdateViews(ΔEntities). If ΔEntities is given as a set of object-at-a-time modifications on cached entities, then Step 1 can be further optimized by executing view maintenance algorithms directly on the modified entities rather than computing the ΔUpdateViews expression.

Translating Updates on Objects

To illustrate the approach outlined above, consider the following example which gives a bonus and promotion to eligible salespeople who have been with the company for at least 5 years.

```
using(AdventureWorksDB aw =
        new AdventureWorksDB(...)) {
    // People hired at least 5 years ago
    Datetime d = DateTime.Today.AddYears (−5);
    var people = from p in aw.SalesPeople
                where p.HireDate < d
                select p;
    foreach(SalesPerson p in people) {
        if(HRWebService.ReadyForPromotion(p)) {
            p.Bonus += 10;
            p.Title = "Senior Sales Representative";
        }
    }
    aw.SaveChanges( ); // push changes to DB
}
```

AdventureWorksDB is a tool-generated class that derives from a generic object services class, called ObjectContext, that houses the database connection, metadata workspace, and object cache data structure and exposes the SaveChanges method. As we explained in the Object Services section, the object cache maintains a list of entities, each of which is in one of the following states: detached (from the cache), added, unchanged, modified, and deleted. The above code fragment describes an update that modifies the title and bonus properties of ESalesPerson objects which are stored in the SEmployees and SSalesPersons tables, respectively. The process of transforming the object updates into the corresponding table updates triggered by the call to the SaveChanges method may comprise the following four steps:

Change List Generation. A list of changes per entity set is created from the object cache. Updates are represented as lists of deleted and inserted elements. Added objects become inserts. Deleted objects become deletes.

Value Expression Propagation. This step takes the list of changes and the update views (kept in the metadata workspace) and, using incremental materialized view maintenance expressions ΔUpdateViews, transforms the list of object changes into a sequence of algebraic base table insert and delete expressions against the underlying affected tables. For this example, the relevant update views are $UV_2$ and $UV_3$ shown in FIG. 6. These views are simple project-select queries, so applying view maintenance rules is straightforward. We obtain the following ΔUpdateViews expressions, which are the same for insertions ($\Delta^+$) and deletions ($\Delta^-$):
ΔSSalesPersons=SELECT p.Id, p.Bonus FROM ΔESalesPersons AS p
ΔSEmployees=SELECT p.Id, p.Title FROM ΔESalesPersons AS p
ΔSContacts=SELECT p.Id, p.Name, p.Contact.Email, p.Contact.Phone FROM ΔESalesPersons AS p Suppose the loop shown above updated the entity $E_{old}$=ESalesPersons(1, 20, " ", "Alice", Contact("a@sales", NULL)) to $E_{new}$=ESalesPersons(1, 30, "Senior . . . ", "Alice", Contact("a@sales", NULL)). Then, the initial delta is $\Delta^+$ESalesOrders={$E_{new}$} for insertions and $\Delta^-$ESalesOrders={$E_{old}$} for deletions. We obtain $\Delta^+$SSalesPersons={(1, 30)}, $\Delta^-$SSalesPersons={(1, 20)}. The computed insertions and deletions on the SSalesPersons table are then combined into a single update that sets the Bonus value to 30. The deltas on SEmployees are computed analogously. For SContacts, we get $\Delta^+$SContacts=$\Delta^-$SContacts, so no update is required.

In addition to computing the deltas on the affected base tables, this phase is responsible for (a) the correct ordering in which the table updates must be performed, taking into consideration referential integrity constraints, (b) retrieval of store-generated keys needed prior to committing updates to the database, and (c) gathering the information for optimistic concurrency control.

SQL DML or Stored Procedure Calls Generation. This step transforms the list of inserted and deleted deltas plus additional annotations related to concurrency handling into a sequence of SQL DML statements or stored procedure calls. In this example, the update statements generated for the affected salesperson are:

```
BEGIN TRANSACTION
UPDATE [dbo] . [SSalesPersons] SET [Bonus]=30
WHERE [SalesPersonID]=1
UPDATE [dbo] . [SEmployees]
SET [Title]= N'Senior Sales Representative'
WHERE [EmployeeID]=1
COMMIT TRANSACTION
```

Cache Synchronization. Once updates have been performed, the state of the cache is synchronized with the new state of the database. Thus, if necessary, a mini-query-processing step is performed to transform the new modified relational state to its corresponding entity and object state.

Metadata

The metadata subsystem is analogous to a database catalog, and is designed to satisfy the design-time and runtime metadata needs of the Entity Framework.

Metadata Artifacts

Metadata artifacts may include the following:

Conceptual Schema (CSDL files): The conceptual schema is usually defined in a CSDL file (Conceptual Schema Definition Language) and contains the EDM types (entity types, relationships) and entity sets that describes the application's conceptual view of the data.

Store Schema (SSDL files): The store schema information (tables, columns, keys etc.) are expressed using CSDL vocabulary terms. For example, EntitySets denote tables, and properties denote columns. Usually, these are defined in an SSDL (Store Schema Definition Language) file.

C-S Mapping Specification (MSL file): The mapping between the conceptual schema and the store schema is captured in a mapping specification, typically in an MSL file (Mapping Specification Language). This specification is used by the mapping compiler to produce the query and update views.

Provider Manifest: The Provider Manifest is a description of functionality supported by each provider, and includes information about:

1. The primitive types (varchar, int, etc.) supported by the provider, and the EDM types (string, int32, etc.) they correspond to.

2. The built-in functions (and their signatures) for the provider.

This information is used by the Entity SQL parser as part of query analysis. In addition to these artifacts, the metadata subsystem also keeps track of the generated object classes, and the mappings between these and the corresponding conceptual entity types.

Metadata Services Architecture

The metadata consumed by the Entity Framework comes from different sources in different formats. The metadata subsystem is built over a set of unified low-level metadata interfaces that allow the metadata runtime to work independently of the details of the different metadata persistent formats/sources.

The metadata services include:
Enumeration of different types of metadata.
Metadata search by key.
Metadata browsing/navigation.
Creation of transient metadata (e.g., for query processing).
Session independent metadata caching and reusing.

The metadata subsystem includes the following components. The metadata cache caches metadata retrieved from different sources, and provides consumers a common API to retrieve and manipulate the metadata. Since the metadata may be represented in different forms, and stored in different locations, the metadata subsystem supports a loader interface. Metadata loaders implement the loader interface, and are responsible for loading the metadata from the appropriate source (CSDL/SSDL files etc.). A metadata workspace aggregates several pieces of metadata to provide the complete set of metadata for an application. A metadata workspace usually contains information about the conceptual model, the store schema, the object classes, and the mappings between these constructs.

Tools

The Entity Framework may include a collection of design-time tools to increase development productivity.

Model designer: One of the early steps in the development of an application is the definition of a conceptual model. The Entity Framework allows application designers and analysts to describe the main concepts of their application in terms of entities and relationships. The model designer is a tool that allows this conceptual modeling task to be performed interactively. The artifacts of the design are captured directly in the Metadata component which may persist its state in the database. The model designer can also generate and consume model descriptions (specified via CSDL), and can synthesize EDM models from relational metadata.

Figure 8:
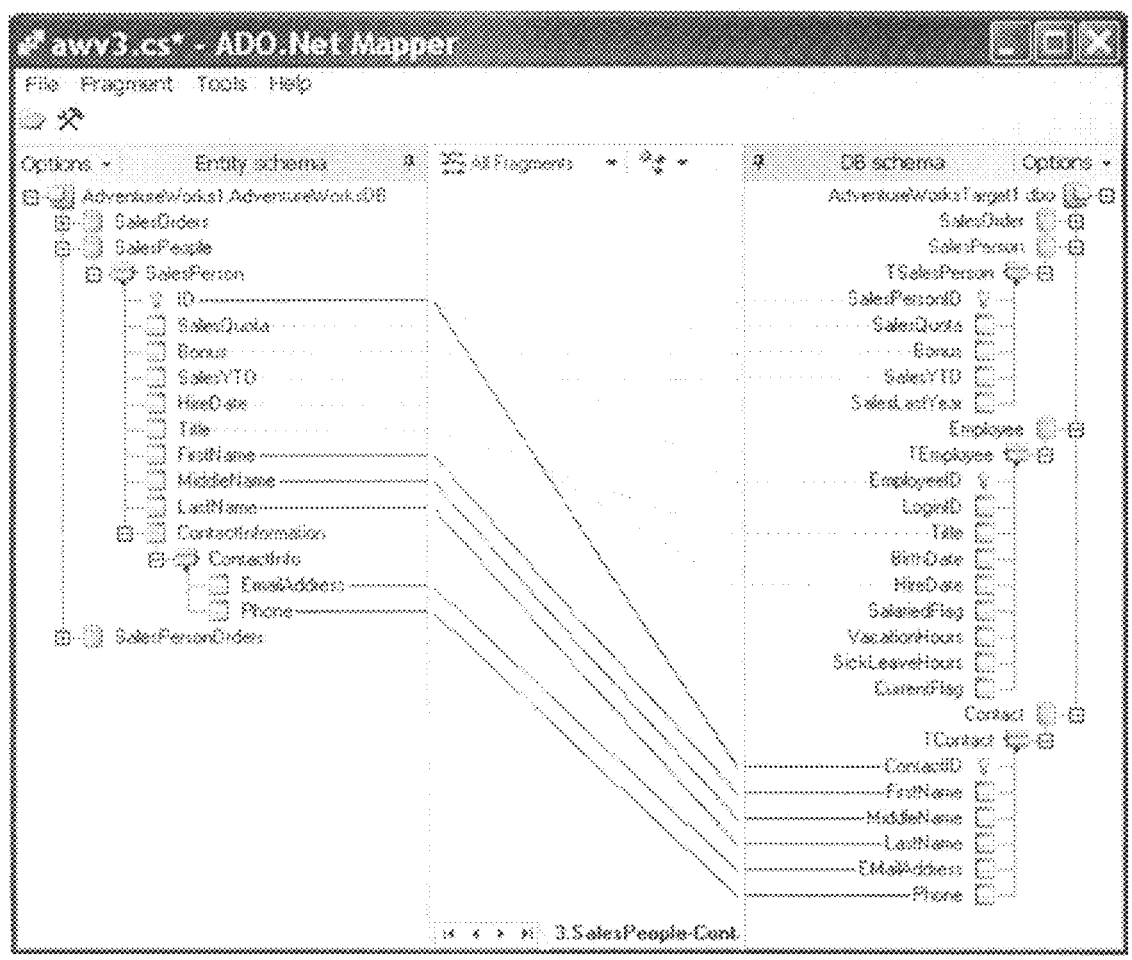
FIG. 8 illustrates a mapping designer user interface.

Mapping designer: Once an EDM model has been designed, the developer may specify how a conceptual model maps to a relational database. This task is facilitated by the mapping designer, which may present a user interface as illustrated in FIG. 8. The mapping designer helps developers describe how entities and relationships in an entity schema presented on the left hand side of the user interface map to tables and columns in the database, as reflected in a database schema presented on the right side of the user interface in FIG. 8. The links in the graph presented in the middle section of FIG. 8 visualize the mapping expressions specified declaratively as equalities of Entity SQL queries. These expressions become the input to the bidirectional mapping compilation component which generates the query and update views.

Code generation: The EDM conceptual model is sufficient for many applications as it provides a familiar interaction model based on ADO.NET code patterns (commands, connections, data readers). However, many applications prefer to interact with data as strongly-typed objects. The Entity Framework includes a set of code generation tools that take EDM models as input and produce strongly-typed CLR classes for entity types. The code generation tools can also generate a strongly-typed object context (e.g., AdventureWorksDB) which exposes strongly typed collections for all entity and relationship sets defined by the model (e.g., ObjectQuery<SalesPerson>).

Further Aspects and Embodiments

As described above, an update pipeline 113 may be utilized in an Entity Framework 100 to persist objects to a database. One embodiment of an exemplary update pipeline 113 is illustrated in FIG. 9.

Figure 9:
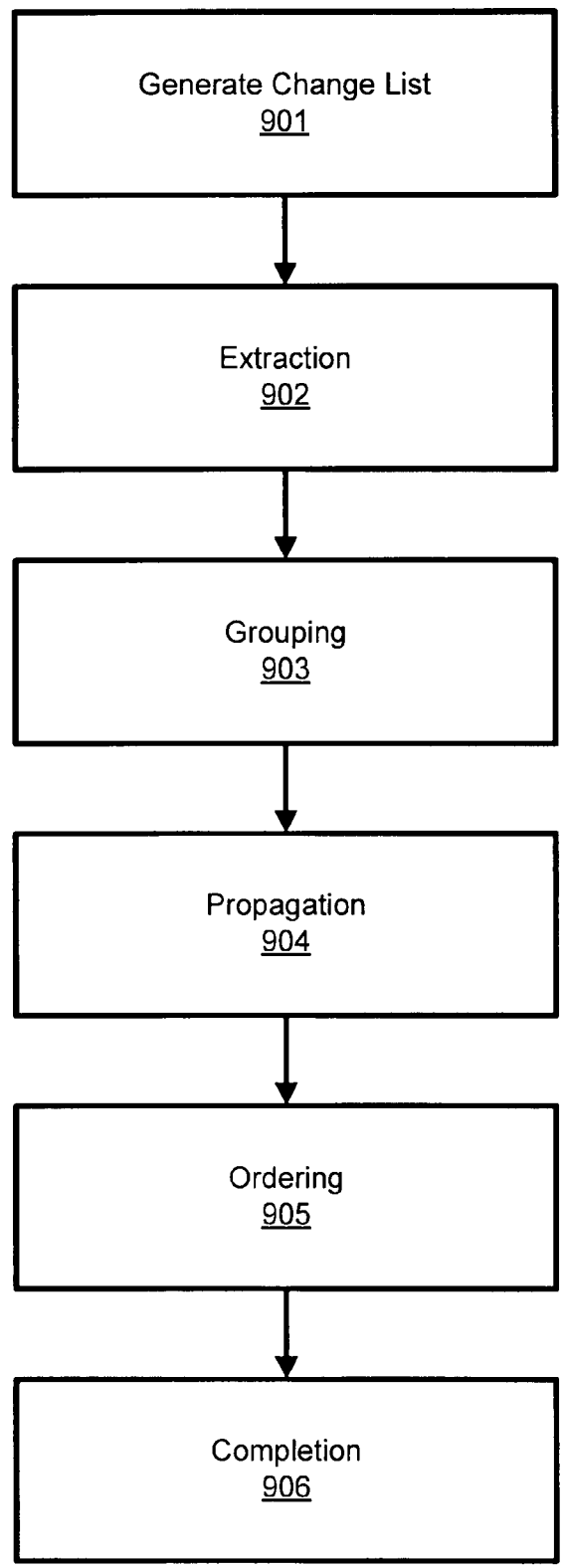
FIG. 9 illustrates an exemplary update pipeline configuration according to an embodiment of the invention.

FIG. 9 illustrates an exemplary update pipeline configuration according to an embodiment of the invention. The elements of FIG. 9 may be viewed as both components, such as software components, in a computer system, as instructions recorded on a computer readable media, or as steps in a method according to the invention.

In general, with regard to a pipeline as illustrated in FIG. 9, a series of steps may be performed whereby a data access layer object runtime is given a list of object updates/inserts/deletes that are first transformed to canonical query tree (CQT) delta expressions. These delta expressions are transformed via an update mapping view into delta expressions in store terms. Store level SQL DML statements are then compiled and executed to implement the required changes in the store.

Within an object context, the data access layer object runtime keeps track of the objects that have been created, updated and deleted. The runtime tracks changes at the level of entities, relationships and first-order attributes therein. When the application requests for these changes to be sent to the server (i.e., by calling a function of the data access layer which may be referred to herein as "SaveChanges"), the operations associated with the update pipeline of FIG. 9 may be executed.

It should be recognized that "runtime" update processing performed by an update pipeline as set forth herein can be complemented by aspects of applications that are configured at "compile time." Such compile time aspects are discussed herein to the extent necessary to illustrate and enable the runtime operation of the update pipeline.

In general, when an application persists its object changes, an update pipeline can translate the object changes into store changes by performing incremental view maintenance with respect to update mapping views generated by a mapping compiler. There are two types of changes that can be performed by applications:

Single object changes—changes made to individual objects while navigating the object graph. For single object changes, the system keeps track of the objects that have been created, updated, and deleted in the current transaction.

Query-based changes—changes performed by issuing an update/delete statement based on a eSQL query as is done in relational databases for updating tables.

This specification describes single-object changes, or "instance-based" updates, and it should be appreciated that similar approaches may be applied to query-based changes scenarios. Certain functionality may be added or removed from the mechanisms for single-object changes, in order to implement an update pipeline for query-based changes, as will be appreciated.

Change List Generation

Referring to FIG. 9, a first step in the update pipeline may be to generate a change list 901. Given an object cache, embodiments may produce a list of delta expressions. Delta expressions are the primary interface between layers in the pipeline. They encapsulate information about data rows and exception information.

A list of delta expressions describes modification requests for particular extents. An "extent" is defined herein as either or both of an entity set and a relationship set.

In one embodiment, a change to a relation R (similarly for EDM extent), denoted as Delta(R), is represented in terms of three artifacts:

Inserts: expression i(R) that produces the tuples to be inserted.

Deletes: expression d(R) that produces keys of tuples to be deleted (a key may be the entire tuple).

Updates: expression u(R) that produces the values of tuples to be updated and the new values for the updated attributes.

i(R), d(R), and u(R) are pairwise disjoint, i.e., reference disjoint sets of keys.

To propagate the changes over view $V(R_1, \ldots, R_n)$ means to compute the changes i(V), d(V), u(V) in terms of the inputs $R_j$, $i(R_j)$, $d(R_j)$, $u(R_j)$ for $1<=j<=n$. In practice, $u(R_i)$ is split into $d(R_i)$ and $i(R_i)$ which get the old and new values respectively.

The input deltas describe the changes made to the extents of entities, compositions and associations. In this description, we focus on changes to entity sets. Compositions and associations are treated analogously—they are specializations of relationships as defined above.

An insert specifies an expression that defines a set of entities built from scalars using type constructors and nesting. Example:

INSERT INTO P VALUES NewPerson(1, "John", {"WA", "CA"}), NewCustomer(2, "Alice", { })

i(P)=SELECT NewPerson(1, "John", {"WA", "CA"}), NewCustomer(2, "Alice", { })

A delete specifies an expression that determines the keys of the entities to be deleted. Example:

DELETE FROM P WHERE pid IN (1, 2, 3)

d(P)=SELECT pid WHERE pid IN (1,2,3)

An update specifies an expression that sets the some fields of the entities to constant expressions. Example:

UPDATE P SET name.fn="John", addrs={ "WA", "CA"} WHERE pid=1 u(P)=SELECT 1, "John" as name.fn, {"WA", "CA"} as addrs

The WHERE clauses in delete and update statements are scalar key comparisons. In update statements, set-valued attributes are updated as a whole (no updates inside sets).

Change List Extraction and Grouping

Referring back to FIG. 9, change list extraction 902 and grouping 903 may be performed next. From the object cache, e.g. a cache on a client computer that is operatively coupled to a server associated with a data store, we can retrieve a list of entities (CacheEntry). This is referred to as extraction 902. The state (DataRowState) of an entity indicates what, if any, update action is required. The following is an exemplary list of states that may be supported, along with a description how to support each state:

Detached: no op (the entity is not associated with the cache)

Added: such entities generate an "insert" expression

Unchanged: no op (we allow "passive" concurrency conflicts)

Modified: such entities generate both an insert and a delete expression

Deleted: such entities generate a "delete" expression

The object cache acts as the interface between objects and value layer (e.g., EDM) constructs. For this reason, the extraction component 902 may directly produce delta expressions at the EDM level. As records are extracted from the cache, they may be marked up in one exemplary embodiment as follows:

1. Each record is associated with a cache entry. Every node in the expression describing the record has a back pointer to the record. This allows fine-grained error reporting.

2. The cache entry exposes an enumeration of modified (first level) properties. These properties and any nested values (if the property is a complex type) have no flag markup. All other nodes are marked "Preserve". All model properties flagged as concurrency control values by Metadata are marked "ConcurrencyValue". Via the markup Ordinal and Parent properties, we can trace a path back to the position in a cache entry holding the value. This allows reverse mapping server generated values to the cache.

Sometimes, we don't have enough information to know which table a value space extent will affect in the store. To illustrate, consider a "foreign key in the store" scenario. Consider what happens if a user modifies only the relationship by assigning an address to a different customer. The update pipeline doesn't need to know anything about the address or the customer to know how the reassignment is performed:

UPDATE SAddress1 SET CustomerID='Bob' WHERE AddressID=1

Now assume now that CAddress1 extent is polymorphic, storing both addresses and US address types. Given the same change, we may not know whether to execute:

UPDATE SAddress1 . . .

Or:

UPDATE SUSAddress1 . . .

In this scenario, we would need to know about the address targeted by a relationship in order to decide where the relationship will live in the store. One exemplary solution to this problem has two parts: first, identify when information extraneous to the update will be relevant to the update, and; second, feed this information to the update pipeline. The second task may be accomplished by passing the pipeline a null-op update request for the entity providing the necessary context.

In some embodiments, a compensation step may be conducted after extraction.

Referring back to FIG. 9, for purposes of propagation, we produce lists of inserted and deleted elements for every extent in a grouping step 903. In one embodiment, each extent has an associated ChangeNode containing these lists:

```
internal class ChangeNode
{
    /// <summary>
    /// Gets the type of the rows contained in this node. This
    type corresponds (not coincidentally) to the type of an
    expression in an update mapping view.
    /// </summary>
    internal TypeUsage ElementType { get; }
    /// <summary>
    /// Gets a list of rows to be inserted.
    /// </summary>
    internal List<PropagatorResult> Inserted { get; }
    /// <summary>
    /// Gets a list of rows to be deleted.
    /// </summary>
    internal List<PropagatorResult> Deleted { get; }
    /// <summary>
    /// Gets or sets a version of a record at this node with
    default values. The record has the type of the node we are
    visiting.
    /// </summary>
    internal PropagatorResult Placeholder { get; set; }
}
```

In the course of extraction 902, cache entries can be transformed to lightweight "PropagatorResult" instances which can be efficiently navigated in during propagation. Notice that we do not explicitly represent updates, but instead track them as inserts (based on CacheEntry.CurrentValues) and deletes (based on CacheEntry.OriginalValues). When compiling store DML expressions, embodiments may merge deletes and inserts.

In one embodiment, translation from records to expressions is handled by a "RecordConverter" class. This class recursively constructs expressions given records. As an optimization, we can cache state required to convert specific to a particular record structure in a "TypeConverter" class. If the converter recognizes a particular record structure (e.g., DataRecordInfo) it can reuse the associated TypeConverter.

Value Propagation

Value expression propagation 904 may be conducted next. In this stage, C delta expressions are mapped to S delta expressions. The propagation component 904 takes as input "update mapping views" retrieved from the metadata workspace and EDM level change requests from the cache.

Update mapping views describe store tables with respect to entities. These views allow us to treat the O-R update problem as a special case of view maintenance. Update views and query views may contain both relational and non-relational operators. In one embodiment, we assume that in query views all non-relational operators appear on the top of the expression tree, whereas in update views all non-relational operators appear at the bottom of the expression tree. This representation is beneficial in eliminating non-relational operators from the change statements sent to the store using simple logic (as opposed to a fully-blown expression simplifier). Bringing the expression trees into this shape could be done in a separate rewriting step. Such separate step desirable, in general, to support DML changes to move non-relational operators upward in the WHERE clauses of DML statements. For instance-based changes, such rewriting step can be avoided if (a) the views with the above property are produced directly in the view generation phase, and (b) DML statements representing inserted entities are segmented, so that all non-relational operators appear on top.

In one embodiment, the relational operators that may appear in the views are:
select (including case statements, equality predicates, AND/OR/NOT, IS OF TYPE)
project
inner join
left outer join
union all (no duplicate elimination)

The non-relational operators that may appear in the views are:
type constructor (for entities and complex values)
field extractor
nest block: combination of group-by and nest operators that perform a single level of nesting
unnest block: combination of (outer) apply and unnest operators that perform a single level of unnesting.

Each query view may have the following structure: QView=NRE(RE1, . . . ,REn) where:
NRE is an non-relational expression containing only type constructors and nest blocks,
RE1, . . . ,REn are purely relational expressions involving one or multiple store tables.

Each update view may have the following structure: UView=RE(NRE1(P1), . . . , NREn(Pn)) where:
RE is a relational-only expression of the following shape: Union(Select(Project(Join|LOJ)*)),
NRE1(P1), . . . ,NREn(Pn) are non-relational expressions over a single extent (entity set/association) of the following shape: Project(Extract|Unnest block)*.

Update views are canonical query trees with certain constraints. The view is an expression returning a result set with columns for every attribute of a store table (the tree is not responsible for interpreting or distinguishing keys, server-generated columns, or concurrency tokens).

Figure 10:
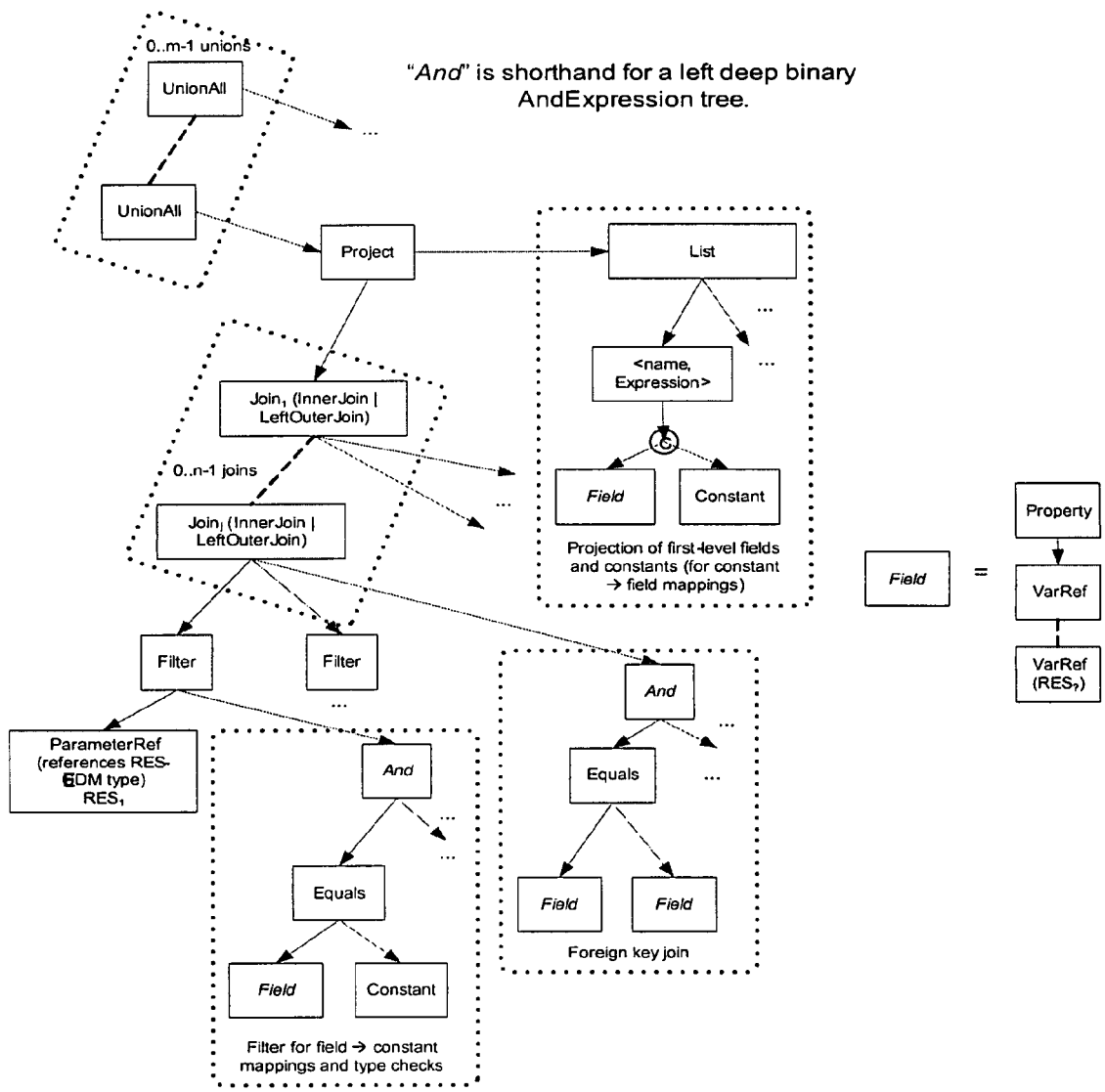
FIG. 10 illustrates subdivision of an update mapping view into separate relational components.

For each table in the store, there is a single update mapping view. In one embodiment, we subdivide the view into separate relational components as illustrated in FIG. 10. Note that in the exemplary embodiment of FIG. 10, the order of nodes is not constrained, only the types of nodes. Filter predicates are not at all constrained.

Figure 11:
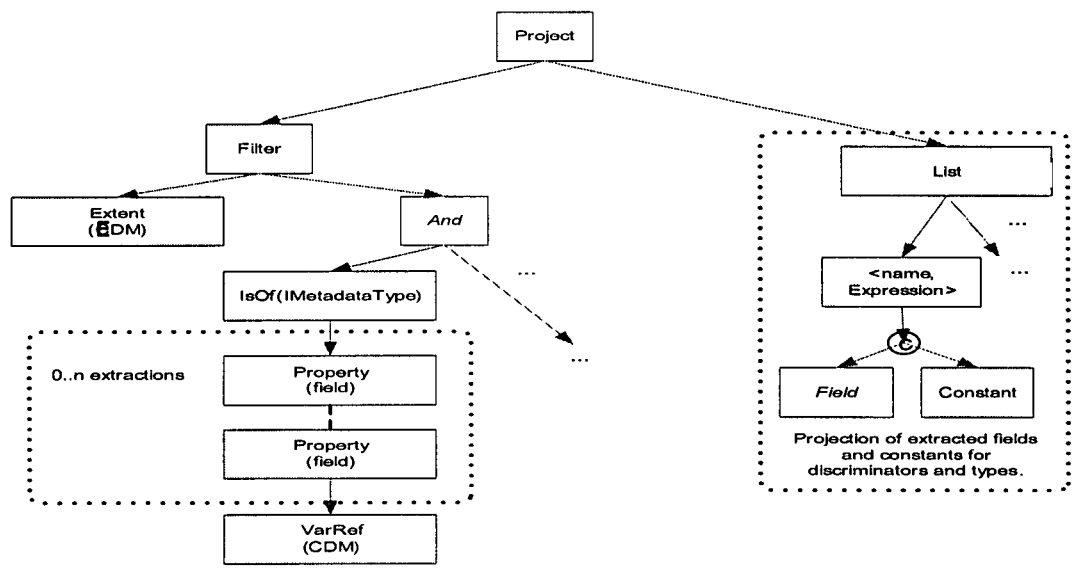
FIG. 11 illustrates subdivision of an update mapping view into multiple non-relational components.

The view may also be subdivided into multiple non-relational components as illustrated in FIG. 11. FIG. 11 illustrates a non-Relational query describing an RES-EDM "extent" with respect to a EDM extent.

As described above, update views can have the form UView=RE(NRE1(P1), . . . , NREn(Pn)). Delta propagation can be done in two steps:
propagate deltas over non-relational expressions NREi
propagate deltas over relational expression RE For the purposes of value propagation, one embodiment can ignore the distinction—all operations are performed in the client, which can perform both relational and non-relational operations—but for the purposes of this document, the distinction is maintained in the interest of generality.

When conducting delta propagation for non-relational expressions (field extractors only), non-relational expression V=NRE(P) contains only unnest blocks and field extractors on top of a single extent P. V has a relational signature.

In one embodiment, inserts and deletes can be propagated in bulk using a simple rule:
Delta(V)=NRE(Delta(P))

In other words, to compute the delta, we simply substitute P by Delta(P) in the input expression.

If NRE(P) contains only field extractors (M1 scenario), we have: V=Project[ . . . ](P), where the project operator contains all field extractors, so Delta(V)=Project[ . . . ]

(Delta(P)). For updates, only the assignment statements of the fields referenced in Project[ . . . ] get propagated.

Example:

Let V(pid, fn, ln)=SELECT p.pid, p.name.fn, p.name.ln FROM p in P

Let i(P)=SELECT NewPerson(1, NewName("John", "Smith"))

Then, i(V)=SELECT p.pid, p.name.fn, p.name.ln FROM p in i(P)={1, "John", "Smith"}

Let u(P)=SELECT 1 as pid, "John" as p.name.fn

Then, u(V) is given as SELECT 1 as pid, "John" as fn

The value propagator 904 translates changes C-Space extents into S-Space commands. It identifies all changes propagated to a specific table in the store. As input, it takes an update mapping view (expressed as a CTree) and a "grouper" which allows the propagator 904 to retrieve changes being applied to an extent.

```
/// <summary>
/// Returns modification groups (as <see cref="ChangeNode" />)
associated with a particular C-Space extent.
/// </summary>
internal interface IGrouper
{
    /// <summary>
    /// Gets changes extracted for a particular C-Space extent.
    /// </summary>
    /// <exception cref="IndexOutOfRangeException">When no
changes are found for an extent.</exception>
    /// <param name="extent">C-Space extent.</param>
    /// <returns>Change node with Deleted and Inserted lists
populated (nothing else)</returns>
        ChangeNode GetExtentModifications(IExtent extent);
}
```

A change node contains information about modifications at a specific node in the update mapping view (UMV). The grouper returns changes related to an extent expression in the UMV (a leaf node in the tree). When the propagator reaches an extent node, it "seeds" the propagator 904 with values returned by the grouper.

The propagator 904 uses a bottom-up recursive approach to propagate changes up UMV. The changes returned from the root of the UMV are changes relative to the underlying store table. The propagator 904 knows how to propagate changes through relational nodes in the UMV (SPUOJ operators):

Inner join and left outer join

Projection

Selection (filter)

Union all

Changes are stored in the ChangeNode structure as they propagate. There is a change node for every relational (SPUOJ) node in the UMV. Note that values are flagged as they propagate to allow maintenance of context for server-generated values, the entity cache, and for "unknown" values.

The result of propagation is a set of ChangeNode structures expressed in store terms (a ChangeNode per affected table). We merge the inserts and deletes in these structures based on the primary key of the table using the TableChangeProcessor utility class.

Values propagating through the stack must be tagged with some additional information in order to facilitate error reporting and to adjust behavior. The following structure may be used to describe a particular value in the pipeline:

```
internal struct RecordMarkup
{
    internal PropagatorFlags Flags { get { return m_flags; } }
    internal CacheEntry CacheEntry { get { return m_cacheEntry;
}}
    internal int Ordinal { get; }
    internal RecordMarkup Parent { get; }
}
```

In one embodiment, flags have the following definition:

```
/// <summary>
/// Tracks roles played by a record as it propagates
/// w.r.t. an update mapping view.
/// </summary>
[Flags]
internal enum PropagatorFlags : byte
{
    /// <summary>
    /// No role.
    /// </summary>
    NoFlags,
    /// <summary>
    /// Value is unchanged. Used only for attributes that appear
in updates (in other words, in both delete and insert set).
    /// </summary>
    Preserve,
    /// <summary>
    /// Value is a concurrency token.
    /// </summary>
    ConcurrencyValue,
    /// <summary>
    /// Value is a key within some extent.
    /// </summary>
    Key,
    /// <summary>
    /// Value is unknown. Used only for attributes that appear
in updates (in other words, in both delete and insert set).
    /// </summary>
    Unknown,
}
```

Thus, in one embodiment, the pipeline 113 illustrated in FIG. 1 takes a description of data modifications to a model, such as the model used by in-memory Common Language Runtime (CLR) objects, and determines modifications to apply to a target, e.g. a persistent data store like a database server. Modifications are propagated (or translated) from the model to the target using a mapping description. The mapping description is in the form of a "view" which declaratively expresses the relationship between the store and the target using relational and non-relational operators.

Generally speaking, the modification propagation performed by an update pipeline is performed using incremental view maintenance techniques. More specifically, embodiments of an update pipeline may account for a number of considerations, such as: 1. View maintenance is advantageously performed in response to modifications to an underlying store. In embodiments of a mapping solution, there may be no physical representation of the model, but rather of the target. 2. In existing commercial systems like SQL Server, view maintenance is performed over highly constrained views. The views supported by the pipeline may be more flexible since the mappings required of a solution can be complex. 3. Current view maintenance techniques reason about inserts and deletes. In contrast, the pipeline may advantageously reason in terms of updates. 4. Not only data, but behaviors such as concurrency validation must be translated from the model to the target.

Embodiments of an update pipeline may accommodate for the above considerations using view maintenance rules that describe how values are translated from model to target given a mapping view. While these rules can be complex, different constraints on supported mappings allow optimizations to those rules.

In one embodiment, for example, view maintenance rules have the following form:
for a particular view operator,
given input modifications and pre-existing data,
produce output modifications.

By successively applying rules for each operator in a mapping view, modifications are mapped from the model to the target.

For instance, a rule for the "projection" operator may be implemented as follows:

```
Operation T = Project_A(M) // projection A of model M → target T
Given
    I(M) // elements inserted into M
    D(M) // elements deleted from M
    M // actual values in model
Rule
    I(T) = Project_A(I(M)) – Project_A(M)
    D(T) = Project_A(D(M)) – Project_A((M – D(M)) union I(M)))
```

The "pre-existing data" input to any rule can be problematic for a mapping solution, because the pre-existing model data may have no straightforward physical representation. In one view maintenance solution, pre-existing data may be available in a physical table. In one exemplary entity framework embodiment, the pre-existing data is taken from the entity model, which is itself a view of the physical table. While technically feasible, the cost of retrieving model data (which must be mapped in the reverse direction via the Query Pipeline) may be prohibitive.

Given certain mapping constraints, we can prove optimized rules eliminating the pre-existing data input terms. For instance, the projection rule can be optimized as follows:

Rule
$I(T)=Project_A(I(M))$
$D(T)=Project_A(D(M))$

Delta Expression Rules

This section lists exemplary rules that may be used for modification propagation. The following operators are used in the views of this example: join, filter, project, join, left outer join and union.

All joins (natural, left, outer, anti) in delta expressions are based on the join criteria for the update view. The goal of the delta expression rules is that:
d(V) is a subset of V: don't try to delete something that doesn't exist.
i(V) has an empty intersection with V: don't try to insert something that is already there.

Based on the first two requirements, we can also infer that d(V) and i(V) are non-overlapping.

There are different versions of each rule based on different assumptions. For each optimization level (1=traditional view maintenance, 2=insert/delete/update compatible, 3=insert/delete compatible, 4=serializable C modification requests only) certain assumptions are made. Details of these assumptions for each optimization level are provided in the chart below.

In some cases (indicated by a highlighted cell in the chart below) the requirements are slightly weaker.
d(V) is still a subset of V
i(V) ⊆ d(V) has an empty intersection with V: don't try to insert something that's already there unless performing an update (there's an insert and a delete for a row with that key.) Note that in this exemplary embodiment, we don't impose the stronger requirement that i(V) has an empty intersection with d(V). There are cases where an entity is split across multiple tables, and we end up updating all of those tables even if the projection excludes that table.

The following legend applies to the table below:

| Mapping View Operation | Rule with Assumption Level 1 | Rule with Assumption Level 2 | Rule with Assumption Level 3 | Rule with Assumption Level 4 Only S | Rule with Assumption Level 4 Only T |
|---|---|---|---|---|---|
| Insert: i(V) | | | | | |
| $\sigma_p(S)$ selection | $\sigma_p(i(S))$ The inserted tuples are subject to the same selection. | Same as Level 1 | Same as Level 1 | Same as Level 1 | |
| $\pi_A(S)$ projection | $\pi_A(i(S)) - \pi_A(S)$ Since projection does not preserve keys, $\pi_A(i(S))$ and $\pi_A(S)$ may intersect. Existing tuples should not be inserted. Therefore those have to be excluded. | $\pi_A i(S)$ Due to the key-preserving assumption $\pi_A(i(S))$ and $\pi_A(S)$ do not intersect. Therefore the subtraction may be removed. | $\pi_A(i(S))$ Same as Level 2. | $\pi_A(i(S))$ | n/a |
| S ⋈ T join | $(S^{new} \bowtie (T)) \cup,$ $(i(S) \bowtie T^{new})$ | Same as Level 1 | $(S^{new} \bowtie (T)) \cup_{all}$ $(i(S) \bowtie (T ⋉ d(T)))$ The intersection between the two operands in Level 1 is $i(S) \bowtie i(T)$. Remove it from the second operand. | | n/a |
| S ∪ T union | $(i(S) - T) \cup$ $(i(T) - S)$ Added tuples are split into the "added to S" and "added to T". In general i(S) and i(T) | $i(S) \cup_{all} i(T)$ Due to the assumption that S and T are disjoint, $S^{new}$ and $T^{new}$ are also disjoint. Therefore i(S) is | $i(S) \cup_{all} i(T)$ Same as Level 2. | $i(S)$ Tuples are added only to S. | $i(T)$ Tuples are added only to T. |

-continued

| Mapping View Operation | Rule with Assumption Level 1 | Rule with Assumption Level 2 | Rule with Assumption Level 3 | Rule with Assumption Level 4 Only S | Rule with Assumption Level 4 Only T |
|---|---|---|---|---|---|
| | may intersect. | disjoint with T, i(T) is disjoint with S, and i(S) is disjoint with i(T) | | | |
| $S \bowtie_L T$ semi-join (left) | $(i(S) \bowtie_L T^{new}) \cup (S^{new} \bowtie i(T)) \cup (((S - d(S)) \bowtie_L (d(T) \bowtie T^{new})) \times \{D_T\})$ A new row is inserted into the result view in one of three cases represented by the above union: there is a new element S; a new element T, or; an existing (not deleted) S with a removed T (not inserted). | Same as Level 1 | $(i(S) \bowtie_L i(T)) \cup_{all} (S^- \bowtie (T)) \cup_{all} (((S \bowtie d(S)) \bowtie d(T)) \times \{D_T\})$ Optimizations are based on the fact that an element T cannot exist independent of S in our model. | $i(S) \bowtie_L T$ Tuples are added only to S. | $(S \bowtie i(T)) \cup_{all} ((S \bowtie_L (d(T) \bowtie i(T))) \times \{D_T\})$ Tuples are added only to T. |
| | | | Delete: d(V) | | |
| $\sigma_p(S)$ selection | $\sigma_p(d(S))$ The deleted tuples are subject to the same selection. | Same as Level 1 | Same as Level 1 | | |
| $\pi_A(S)$ projection | $\pi_A(d(S)) - \pi_A(S^{new})$ Since projection does not preserve keys, $\pi_A(d(S))$ and $\pi_A(S^{new})$ may intersect. The intersection consists of tuples that should not be deleted | $\pi_A(d(S))$ Due to the key-preserving assumption $\pi_A(d(S))$ and $\pi_A(S^{new})$ do not intersect. Therefore the subtraction may be removed. | $\pi_A(d(S))$ Same as Level 2. | $\pi_A(d(S))$ | n/a |
| $S \bowtie T$ join | $(S \bowtie d(T)) \cup (d(S) \bowtie T)$ | Same as Level 1 | $(S \bowtie d(T)) \cup_{all} (d(S) \bowtie (T \bowtie d(T)))$ The intersection between the two operands in Level 1 is $d(S) \bowtie d(T)$. Remove it from the second operand. | | n/a |
| $S \cup T$ union | $(d(S) - T^{new}) \cup (d(T) - S^{new})$ Deleted tuples are split into the "deleted from S" and "deleted from T". In general d(S) and d(T) may intersect. | $d(S) \cup_{all} d(T)$ Due to the assumption that S and T are disjoint, $S^{new}$ and $T^{new}$ are also disjoint. Therefore d(S) is disjoint with $T^{new}$, d(T) is disjoint with $S^{new}$, and d(S) is disjoint with d(T). | $d(S) \cup_{all} d(T)$ Same as Level 2. | d(S) Tuples are deleted only from S. | d(T) Tuples are deleted only from T. |
| $S \bowtie_L T$ semi-join (left) | $(d(S) \bowtie_L T) \cup (S \bowtie d(T)) \cup (((S - d(S)) \bowtie (i(T) \bowtie T)) \times \{D_T\})$ An existing row is deleted from the result view in one of three cases represented by the above union: there is a deleted element S; deleted element T, or; an existing (not deleted) S with an existing T (not deleted). | Same as Level 1 | $(d(S) \bowtie_L T) \cup_{all} (S \bowtie d(S)) \bowtie d(T)) \cup_{all} (((S \bowtie d(S)) \bowtie i(T)) \times \{D_T\})$ Optimizations are based on the fact that an element T cannot exist independent of S in our model. | $d(S) \bowtie_L T$ Tuples are deleted only from S. | $(S \bowtie d(T)) \cup_{all} ((S \bowtie (i(T) \bowtie d(T))) \times \{D_T\})$ Tuples are deleted only from T. |

Legend:
$\bowtie$: anti-semijoin
$\{D_s\}$: null extended row for S
$\cup_{all}$: union with duplicates (UNION ALL)
$S^{new} = (S - d(S)) \cup i(S) \rightarrow_{optimized} (S \bowtie d(S)) \cup_{all} i(S)$
$S^- = S \bowtie d(S)$

Optimization Level Assumptions

In one embodiment, an update pipeline may utilize four "levels" of optimization based on different assumptions and constraints on the mappings. Rules may also be defined for several standard relational operators such as projection, selection, union, inner join, and left outer join.

Level 2 assumptions are compatible with all insert, deletes and updates (expressed as inserts and deletes) in the pipeline. Level 3 assumptions are compatible only with inserts and deletes. Level 4 assumes we only get modification requests for a single C-Space extent at a time.

Level 1:
S, d(S) and i(S) are sets (every record is unique)

Level 2 (includes level 1):
All joins are foreign key based
All base relations have key
All projections preserve key
All relations participating in union are disjoint and have at least one disjoint key
d(S) is a subset of S
$\pi_{key}$ (i(S)⋉S)) is a subset of $\pi_{key}$ (d(S)). In other words, we never attempt to insert an existing record key unless we're also deleting it (in other words, updating it).

Level 3 (includes level 1 and 2):
i(S) is key disjoint with S (corollary: i(S) and d(S) are key disjoint)

Level 4 (includes level 1, 2, and 3):
We will never get deltas from more than one extent at a time. (This disqualifies natural joins altogether).

Explanation of optimizations
In this document, the correctness of optimization level 1 rules is assumed.

1. Projection: $\pi_A$(i(S))−$\pi_A$(S)→$\pi_A$(i(S)), Level 2
This is based on the key preservation assumption, the "duplicate key inserts are actually updates" assumption, and the relaxed requirement.

2. Projection: $\pi_A$(i(S))−$\pi_A$(S)→$_A$(i(S)), Level 3
Since projections preserve keys and i(S) and S are key disjoint, no element of $\pi_A$(S) is in S.

3. Optimized $S^{new}$ expression: (S−d(S))∪i(S))→(S ⋉ d(S))∪$_{all}$ i(S), Level 2 assumptions, Level 3 requirements
S−d(S)→S ⋉ d(S):d(S) is a subset of S (Level 2 assumption)
(S ⋉ d(S))∪i(S)→(S ⋉ d(S))∪$_{all}$ i(S):i(S) and S ⋉ d(S) are key disjoint 4. Join: (i(S)⋈T$^{new}$)∪(S$^{new}$⋈i(T))→(S$^{new}$⋈i(T))∪$_{all}$(i(S)⋈(T⋉d(T))), Level 3
Given level 3 assumptions, the two expressions are actually equivalent. Each side is a subset of the other. First, we determine that the optimized expression produces no duplicates:
S$^{new}$⋈i(T) has distinct rows based on key preservation and key disjoint-ness.
(i(S)⋈(T⋉d(T)) has distinct rows based on same.
The two union terms are mutually key disjoint because the right hand terms in the join are key disjoint.

Now we show that the optimized rule is a subset of the original rule:
(i(S)⋈T$^{new}$) is a common term, so it suffices to demonstrate that i(S)⋈(T ⋉ d(T)) is a subset of i(S)⋈T$^{new}$=i(S)⋈((T ⋉ d(T))∪$_{all}$ i(T)) (which is trivially true).

Finally, we show that the original rule is a subset of the optimized rule:
(i(S)⋈T$^{new}$) is a common term, so it suffices to demonstrate that (i(S)⋈(T⋉ d(T)) ∪$_{all}$ i(T)) is a subset of ((S ⋉ d(S))∪$_{all}$ i(S)⋈ i(T))∪$_{all}$ (i(S)⋈(T⋉d(T))) (which is trivially true).

Level 5 Optimizations
We introduce these optimizations in a separate section because their exposition is different.

Legend
*=join
*$_l$=left outer join
+=union
+$_{all}$=union all
[[E]]=artificial expansion of an extent across a join. For every term on the other side of the join, introduces a value with the expected key and extended with "unknown" placeholders. If the expected key is not available (e.g., the right hand side of an LOJ), all expansion is with "unknown".
x=cross join
I(E)=insert set for an extent
D(E)=delete set for an extent
{D$_E$}=null expansion of an extent
−=antisemijoin
<=semijoin Level 5 Assumptions:
Level 1 and 2 assumptions, and:
Given a mapping fragment between extent E and table T, the key of E must be unique in T. In practice, we assert that the key of E has fields that are a superset of the keys of T.
The key for a relationship set extent is the composite key of the extents referenced by the relationship. For a composition, it is the key of the composition element plus the keys of all parent extents.
This new assumption ensures that a join will never produce more rows than contained in the left hand side (and each left hand row will join with at most one right hand row).

Goals:
Remove all references to the extents in the propagation rule.
Correctness.
The key is to substitute placeholders ([[E]]) for these references and demonstrate that they always cancel out when merging inserts and deletes into updates.

Optimizations:
The level 2 union, projection, and selection rules already satisfy our goals, so there is no need to exploit the additional constraint.

Join V=S*T
The delta propagation rules given level 1 and level 2 optimizations:

$$I(V)=(((S-D(S))+\text{all } I(S))*I(T))+(I(S)*((T-D(T))+\text{all } I(T)))$$

$$D(V)=(S*D(T))+(D(S)*T)$$

Given our assumptions, we illustrate for all legal combinations of input deltas and the reduced rules. Notice that each entry in the matrix describes a set of modifications referencing a single entity (or extent member) and directly related Delta propagation rules for level 5 optimization:

| S and T deltas related by key | D(S) + I(S) (updating an extent) | D(S) | I(S) | neither |
|---|---|---|---|---|
| D(T) + I(T) | I(V) = I(S) * I(T) | I(V) = { } | I(V) = { } | I(V) = [[S]] * I(T) |
|  | D(V) = D(S) * D(T) | D(V) = { } | D(V) = { } | D(V) = [[S]] * D(T) |
| D(T) | I(V) = { } | I(V) = { } | I(V) = { } | I(V) = { } |
|  | D(V) = { } | D(V) = D(S) * D(T) | D(V) = { } | D(V) = { } |

-continued

| S and T deltas related by key | D(S) + I(S) (updating an extent) | D(S) | I(S) | neither |
|---|---|---|---|---|
| I(T) | I(V) = { } | I(V) = { } | I(V) = I(S) * I(T) | I(V) = { } |
|  | D(V) = { } | D(V) = { } | D(V) = { } | D(V) = { } |
| neither | I(V) = I(S) * [[T]] | I(V) = { } | I(V) = { } | I(V) = { } |
|  | D(V) = D(S) * [[T]] | D(V) = { } | D(V) = { } | D(V) = { } |

Explanations of Reductions.

Inserting both sides<I(T), I(S)>, I(V)=I(S)*I(T), D(V)={ }

```
I(V) = (((S − D(S)) +all I(S)) * I(T)) + (I(S) * ((T − D(T)) +all I(T)))
                                                  -- Original form
    = ((S +all I(S)) * I(T)) + (I(S) * (T +all I(T)))
                                                  -- Remove empty elements
    = (I(S) * I(T)) + (I(S) * I(T))   -- I(S) joins I(T) (given that each S can
    join with at most one T)
    = I(S) * I(T)                     -- A + A = A
D(V) = (S * D(T)) + (D(S) * T)        -- Original form
D(V) = { }                            -- Removing empty elements
```

Deleting both sides<D(T), D(S)>, D(V)=D(S)*D(T), I(V)={ }

```
D(V) = (S * D(T)) + (D(S) * T)        -- Original form
     = ((S − D(S) + D(S)) * D(T)) + (D(S) * (T − D(T) + D(T)))
                                      -- D(S) is a subset of S
     = (D(S) * D(T)) + (D(S) * D(T))  -- A row in S can join at most one
     row in T, D(S) joins with D(T)
     = D(S) * D(T)                    -- A + A = A
I(V) = (((S − D(S)) +all I(S)) * I(T)) + (I(S) * ((T − D(T)) +all I(T)))
                                      -- Original form
     = { }                            -- Removing empty elements
```

Updating both sides<{D(S), I(S)}, {D(T), I(T)}>, I(V)=I(S)*I(T), D(V)=D(S)*D(T)

```
I(V) = (((S − D(S)) +all I(S)) * I(T)) + (I(S) * ((T − D(T)) +all I(T)))
-- Original form
    = (I(S) * I(T)) + (I(S) * I(T))   -- Level 2 assumption: I(S) key
    intersects S only if I(S) in D, and;
                                       -- I(S) joins I(T)
    = I(S) * I(T) -- A + A = A
D(V) = (S * D(T)) + (D(S) * T)        -- Original form
     = (D(S) * D(T)) + (D(S) * D(T))  -- D(S) is a subset of S and D(S) joins
     D(T)
     = D(S) * D(T)                    -- A + A = A
```

Updating S<nothing, {I(S), D(S)}>

```
I(V) = (((S − D(S)) +all I(S)) * I(T)) + (I(S) * ((T − D(T)) +all I(T)))
                                       -- Original form
     = I(S) * T                        -- Removing empty elements
D(V) = (S * D(T)) + (D(S) * T)         -- Original form
     = D(S) * T                        -- Removing empty elements
```

Updating T<{I(T), D(T)}, nothing>
Same demonstration as above.
Left outer join V=S*$_l$T
Propagation rules given level 1 and 2 optimizations:

$$I(V)=(I(S)*l\ Tnew)+(Snew*i(T))+(((S-D(S))<(D(T)-Tnew))\times\{DT\})$$

$$D(V)=(D(S)*l\ T)+(S*D(T))+(((S-D(S))<(I(T)-T))\times\{DT\})$$

Propagation rules given level 5 optimizations:

| S and T deltas related by key | D(S) + I(S) (updating an extent) | D(S) | I(S) | Neither |
|---|---|---|---|---|
| D(T) + I(T) | I(V) = I(S) * I(T) | I(V) = { } | I(V) = { } | I(V) = [[S]] * I(T) |
|  | D(V) = D(S) * D(T) | D(V) = { } | D(V) = { } | D(V) = [[S]] * D(T) |
| D(T) | I(V) = I(S) × {D$_T$} | I(V) = { } | I(V) = { } | I(V) = [[S]] × {D$_T$} |
|  | D(V) = D(S) * D(T) | D(V) = D(S) * D(T) | D(V) = { } | D(V) = [[S]] * D(T) |
| I(T) | I(V) = I(S) * I(T) | I(V) = { } | I(V) = I(S) * I(T) | I(V) = [[S]] * I(T) |
|  | D(V) = D(S) × {D$_T$} | D(V) = { } | D(V) = { } | D(V) = [[S]] × {D$_T$} |
| neither | I(V) = I(S) * [[T]] | I(V) = { } | I(V) = I(S) × {D$_T$} | I(V) = { } |
|  | D(V) = D(S) * [[T]] | D(V) = D(S) × {D$_T$} | D(V) = { } | D(V) = { } |

In these tables, all [[E]] entries either include the key for the table (based on the assumptions) or the other half of the join contains the key for the table (again, based on the assumptions). Whenever such an entry appears in an insert, there is a corresponding delete for that row. This means we have sufficient information to perform an update (key+ changed values).

Explanation of Optimizations:

Delta propagation rule (level 1+2 optimization):

$$I(V) = (I(S) *l\ Tnew) + (Snew * i(T)) + (((S − D(S)) < (D(T) − Tnew)) \times \{DT\})$$

$$D(V) = (D(S) *l\ T) + (S * D(T)) + (((S − D(S)) < (I(T) − T)) \times \{DT\})$$

Updating both sides<{D(S), I(S)}, {D(T), I(T)}>, I(V)=I(S)*I(T), D(V)=D(S)* D(T)

```
I(V) = (I(S) *1 Tnew) + (Snew * i(T)) + (((S - D(S)) < (D(T) - Tnew)) × {DT})
                        -- Original form
I(S) *1 Tnew --> I(S) * I(T)    -- Reduction 1: I(S) joins I(T) by definition
(D(T) - Tnew) --> { }           -- Reduction 2: there is a corresponding I(T) for D(T)
I(V) = (I(S) * I(T)) + (I(S) * I(T)) + { }
                        -- Applying reductions 1 and 2
= I(S) * I(T)           -- A + A + { } = A
D(V) = (D(S) *1 T) + (S * D(T)) + (((S - D(S)) < (I(T) - T)) × {DT})
                        -- Original form
D(S) *1 T               --> D(S) * D(T) -- R1: the row of T that joins with S is in D(T)
I(T) - T                --> { } -- R2: every I(T) has a corresponding D(T), and;
                        -- D(T) is a subset of T
D(V) = (D(S) * D(T)) + (D(S) * D(T)) + { }
                        -- R1 + R2
= D(S) * D(T)           -- A + A + { } = A
```

Updating S and deleting T<D(S)+I(S), D(T)>

```
I(V) = (I(S) *1 Tnew) + (Snew * i(T)) + (((S - D(S)) < (D(T) - Tnew)) × {DT})
                        -- Original form
I(V) = (I(S) *1 Tnew) + (((S - D(S)) < (D(T) - (T - D(T)))) × {DT})
                        -- Remove empty elements
= (I(S) × {DT}) + (((S - D(S)) < (D(T) - (T - D(T)))) × {DT})
                        -- I(S) joins with nothing in Tnew (removing that single row)
= I(S) × {DT}           -- (S - D(S)) < D(T) is empty because D(T) has a
corresponding D(S)
D(V) = (D(S) *1 T) + (S * D(T)) + (((S - D(S)) < (I(T) - T)) × {DT})
                        -- Original form
D(S) *1 T --> D(S) * D(T)   -- R1: D(S) has a counterpart D(T) which is a subset of T
I(T) - T --> { }            -- R2: every I(T) has a corresponding D(T), and;
                        -- D(T) is a subset of T
D(V) = (D(S) * D(T)) + (D(S) * D(T)) + { }
                        -- R1 + R2
= D(S) * D(T)           -- A + A + { } = A
```

Updating S and inserting T<D(S)+I(S), I(T)>

```
I(V) = (I(S) *1 Tnew) + (Snew * i(T)) + (((S - D(S)) < (D(T) - Tnew)) × {DT})
                        -- Original form
I(S) * Tnew             --> I(S) * I(T) -- R1: There is a counterpart to I(S) in
                        I(T)
I(V) = I(S) * I(T)      -- R1 + D(T) is empty
D(V) = (D(S) *1 T) + (S * D(T)) + (((S - D(S)) < (I(T) - T)) × {DT})
                        -- Original form
D(S) *1 T --> D(S) × {DT}   -- R1: We're inserting the T corresponding to D(S)
I(T) - T --> I(T)           -- R2: e can't insert something that's already there
(S - D(S)) < I(T) --> { }   -- Every I(T) has a corresponding D(S)
D(V) = D(S) × {DT}          -- R1 + R3 + D(T) is empty
```

Updating S<D(S)+I(S), nothing>

```
I(V) = (I(S) *1 Tnew) + (Snew * i(T)) + (((S - D(S)) < (D(T) - Tnew)) ×
{DT})
                        -- Original form
= I(S) *1 T             -- Removing empty elements
D(V) = (D(S) *1 T) + (S * D(T)) + (((S - D(S)) < (I(T) - T)) × {DT})
                        -- Original form
= D(S) *1 T             -- Removing empty elements
```

Deleting S and deleting T<D(T), D(S)>

```
I(V) = (I(S) *1 Tnew) + (Snew * i(T)) + (((S - D(S)) < (D(T) - Tnew)) ×
{DT})
                        -- Original form
(S - D(S)) < D(T) --> { }   -- R1: Every D(T) has a corresponding D(S)
I(V) = { }                  -- Removing empty elements and R1
D(V) = (D(S) *1 T) + (S * D(T)) + (((S - D(S)) < (I(T) - T)) × {DT})
                        -- Original form
D(S) *1 T --> D(S) * D(T)   -- R1: D(S) has corresponding D(T) (in T)
D(V) = D(S) * D(T)          -- R1 + removing empty elements
```

Deleting S<nothing, D(S)>

```
I(V) = (I(S) *1 Tnew) + (Snew * i(T)) + (((S - D(S)) < (D(T) - Tnew)) ×
{DT})
                        -- Original form
{ }                     -- Removing empty elements
D(V) = (D(S) *1 T) + (S * D(T)) + (((S - D(S)) < (I(T) - T)) × {DT})
                        -- Original form
D(S) *1 T               -- Removing empty elements
D(S) × {DT}             -- Can't delete S if there's a corresponding T
```

Inserting S and T<I(T), I(S)>

```
I(V) = (I(S) *1 Tnew) + (Snew * i(T)) + (((S - D(S)) < (D(T) - Tnew)) ×
{DT})
                        -- Original form
I(S) *1 Tnew --> I(S) * I(T)   -- R1: There is a corresponding I(T)
I(V) = I(S) * I(T)             -- R1 + removing empty elements
D(V) = (D(S) *1 T) + (S * D(T)) + (((S - D(S)) < (I(T) - T)) × {DT})
                        -- Original form
= { }                   -- Removing empty elements
```

Inserting S<nothing, I(S)>

```
I(V) = (I(S) *1 Tnew) + (Snew * i(T)) + (((S − D(S)) < (D(T) − Tnew)) × {DT})
                    -- Original form
    = I(S) *1 T     -- Removing empty elements
    = I(S) × {DT}   -- T can't exist before there's an S
D(V) = (D(S) *1 T) + (S * D(T)) + (((S − D(S)) < (I(T) − T)) × {DT})
                    -- Original form
    = { }           -- Removing empty elements
```

Updating T<D(T)+I(T), nothing>

```
I(V) = (I(S) *1 Tnew) + (Snew * i(T)) + (((S − D(S)) < (D(T) − Tnew)) × {DT})
                          -- Original form
D(T) − Tnew --> { }       -- R1: every D(T) has a corresponding I(T)
I(V) = S * I(T)           -- R1 + removing empty elements
D(V) = (D(S) *1 T) + (S * D(T)) + (((S − D(S)) < (I(T) − T)) × {DT})
                          -- Original form
I(T) − T --> { }          -- R1: Every I(T) has a corresponding D(T) in T
D(V) = S * D(T)           -- R1 + removing empty elements
```

Deleting T<D(T), nothing>

```
I(V) = (I(S) *1 Tnew) + (Snew * i(T)) + (((S − D(S)) < (D(T) − Tnew)) × {DT})
                          -- Original form
D(T) − Tnew --> D(T)      -- R1: D(T) is not in Tnew (no corresponding I(T))
S < D(T) --> S * D(T)     -- R2: there is a corresponding S for D(T) (constraint)
S * D(T) × {DT}-->  S × {DT} -- R3: R2 + existence of related S for D(T)
I(V) = S *x {DT}          -- R1 + R2 + removing empty elements
D(V) = (D(S) *1 T) + (S * D(T)) + (((S − D(S)) < (I(T) − T)) × {DT})
                          -- Original form
    = S * D(T)            -- Removing empty elements
```

Inserting T<I(T), nothing>

```
I(V) = (I(S) *1 Tnew) + (Snew * i(T)) + (((S − D(S)) < (D(T) − Tnew)) × {DT})
                          -- Original form
    = S * i(T)            -- Removing empty elements
D(V) = (D(S) *1 T) + (S * D(T)) + (((S − D(S)) < (I(T) − T)) × {DT})
                          -- Original form
S < I(T) × {DT}           -- Removing empty elements
S × {DT}                  -- I(T) has a corresponding S (constraint)
```

Database (Store) Operations

The store may be configured to have the ability to generate values for certain columns either when a row is inserted or when a row is updated. The following scenario illustrates the important concepts for the handling of server-generated values in the store.

Consider the following store schema:

```
create table SPerson1(
    pid int identity(1,1) primary key, -- server generated key
    name nvarchar(512),
    ts timestamp, -- server generated timestamp
    added_date datetime default(getdate( )) -- server generated detail
)
create table SAddress1(
    aid int identity (1,1) primary key,
    city nvarchar (512),
    pid int references SPerson1(pid)
)
```

To add a person and his address, we can use the following T-SQL commands:
declare @pid int
insert into SPerson1(name) values ('CMeek')
select @pid=scope_identity( )
insert into SAddress1(city, pid) values ('Seattle', @pid)

These DML statements result in something similar to the following:

| pid | name | ts | added_date |
|---|---|---|---|
| 1 | CMeek | 0x00000000000007D1 | 2006-05-10 13:06:13.310 |

| aid | city | pid |
|---|---|---|
| 1 | Seattle | 1 |

This is a useful illustration of server-generated values:

Server-generated keys can influence subsequent operations within a single update payload. In this example, we use @pid to determine the value of the foreign key for the related address.

Some values can only be generated by the server and not modified.

Some values are fixed for the lifetime of a row.

Some values are generated when the row is inserted.

Some values are regenerated when the row is updated.

In the above example, columns have the following behaviors:

| | | | | |
|---|---|---|---|---|
| SPerson1.pid | Yes | Yes | Yes | Yes |
| SPerson1.name | | | | |
| SPerson1.ts | | Yes | | Yes | Yes |
| SPerson1.added_date | | | No | Yes | |
| SAddress1.aid | Yes | Yes | Yes | Yes |
| SAddress1.city | | | | |
| SAddress1.pid | | | | |

Server generation flags may also be usefully implemented. The above categories can be generalized, so that a store column is described using a combination of the following flags:

1=Unmodifiable (1||2||3)
2=GeneratedOnUpdate (5)
4=GeneratedOnInsert (4)

If a column is marked "Unmodifiable", we fail if the property is marked "modified"by the cache. If a value is marked GenerateOnUpdate or GenerateOnInsert, we retrieve and back-propagate the value when performing updates or inserts respectively.

In one embodiment, values in the update pipeline are associated with a "RecordMarkup" object, which provides sufficient context for the back-propagation of values to the appropriate fields in the cache entries volunteering those fields. The back-pointer in the markup has two components:

1. The ordinal of the field in the record.

2. In the case of nested records (e.g., for complex types), a pointer to the parent markup.

Values extracted from relationship refs do not have back-pointers, since keys are immutable (except in the special case of server-generated keys, which are transitively fixed up by the cache).

Additional state may be required to track server-generated keys: values that are generated and shared across extents. We use a simple strategy to determine how values are shared: before propagation, we tag entity key property values with identifiers that are global to the context. When propagation is complete, we use these identifiers to determine which DML statement parameters are shared (consider this "side-propagation" of server gen keys) and which parameters introduce ordering dependencies. An input parameter with global identifier x must precede output parameters with global identifier x.

Thus, in summary, a modification payload may be propagated through predicates and relational operators. The modification payload includes data, concurrency control data, and modification details.

Ordering

Store ordering 905 may be conducted next. Store constraints and model dependencies constrain the order in which operations can be applied in the store. For instance, we must insert an order detail before an order given a foreign key constraint between two tables. If key values are generated by the store (e.g., SQL Server identity columns), this requires us to acquire the generated key before producing or modifying records related to the key through either associations or entity splitting.

Once ordering 905 is complete, we have a list of store-level delta expressions, where the ordering respects functional dependencies of the rows being modified. A delta expression is simply an expression (or query) describing rows to be inserted or deleted in a specific table.

Some specific store capabilities or requirements can change the handling of store ordering. For instance, the ability to defer constraint checking until transaction commit time can remove the need for ordering of any kind.

Layered dependency ordering for store changes can comprise coarse ordering based on table integrity constraints, fine-grained ordering based on table row, and/or a hybrid solution in which coarse ordering is performed to produce a full dependency graph, then fine-grained ordering is performed for decomposition of the remainder.

When updates are submitted to the backend databases, they need to be applied in a certain order so that the database constraints are not violated during the update process. For example, if there is a foreign-key constraint between two tables SPerson and SAddress, we need to ensure that if an address is inserted into SAddress, the corresponding person must exist. To ensure that we do not violate primary key, unique key and foreign key constraints during the update process, we perform a dependency analysis to determine the appropriate order. The SQL standard allows constraint checking to be disabled until the transaction commit call is made but most databases including SQL Server do not support this feature; instead they perform constraint-checking eagerly.

In one embodiment, an algorithm may be run at compile time that determines the partial order for operations on different relations; this algorithm can generate a dependency graph with operations on tables as nodes and an edge is placed from nodes A to B if A needs to be done before B, e.g., an edge from Insert(SPerson) to Insert(SAddress) says that an insert into SPerson needs to happen before we perform the insertion on the SAddress relation. This dependency graph information is stored in the metadata repository so that it can be used during the runtime execution.

Note that it is possible that a cycle exists in the dependency graph such that there is no order in which the changes can be applied. If such circular dependencies were allowed in the database, we would allow cyclic dependency graphs during the compilation process—at runtime, if no total order can be determined, we abort the transaction. This approach is based on the premise that even though a cycle exists at compile-time, it may not exist at runtime since some of the relations in the cycle may not have any updates.

The outcome of this stage is the same as for delta propagation is an ordered list of<op, table> pairs, indicating (for instance) that inserts into SPerson should precede inserts into SAddress.

Server-generation dependencies may be dealt with as follows. When extracting records from the cache, we annotate all key values with global identifiers (Int64 auto-increment within the session). In the case of a composite key, each key element has its only global identifier. As commands are compiled, we identify server generated columns from the metadata service. If one such column takes a value tagged with a global identifier, we register dependencies from the operation producing the global identifier to all operations consuming the global identifier.

Given a series of store level change requests (ChangeNodes in store terms), method may be used, which comprises first producing a dependency ordering graph, where each node is a tuple describing the operator (Insert, Delete or Update) and extent. Based on the above matrix, we introduce dependency arcs into the graph. To determine a valid ordering, we simply perform a topological sort on the graph. By performing a destructive sort (which removes all elements for which there is an ordering), we can determine the remaining dependency work by examining the remaining nodes in the graph (these nodes may contain cycles). We decompose the remaining nodes into row level operations, and repeat the process based on row level dependencies. For instance, in the first phase we might determine that it is possible to insert all managers before their employees, assuming managers and employees have separate tables. If managers and employees live in the same table, there that table has a self ordering constraint, so the node needs to be decomposed into individual rows.

Completion

Finally, completion 906 is performed to complete the update. This may involve confirming that the update was appropriate and accurately executed, and ending the process so as to move on to other tasks.

The update pipeline is preferably configured to produce minimal store changes. Commands may be configured to touch only data that was explicitly modified by user (including data affected through predicates). Inserts and/or deletes in entity space can become simple updates in the data store. Updates in entity space can become either inserts or deletes in the data store. Propagation of incomplete data can be handled so as to identify unknown data that can "cancel out" in updates.

Figure 12:
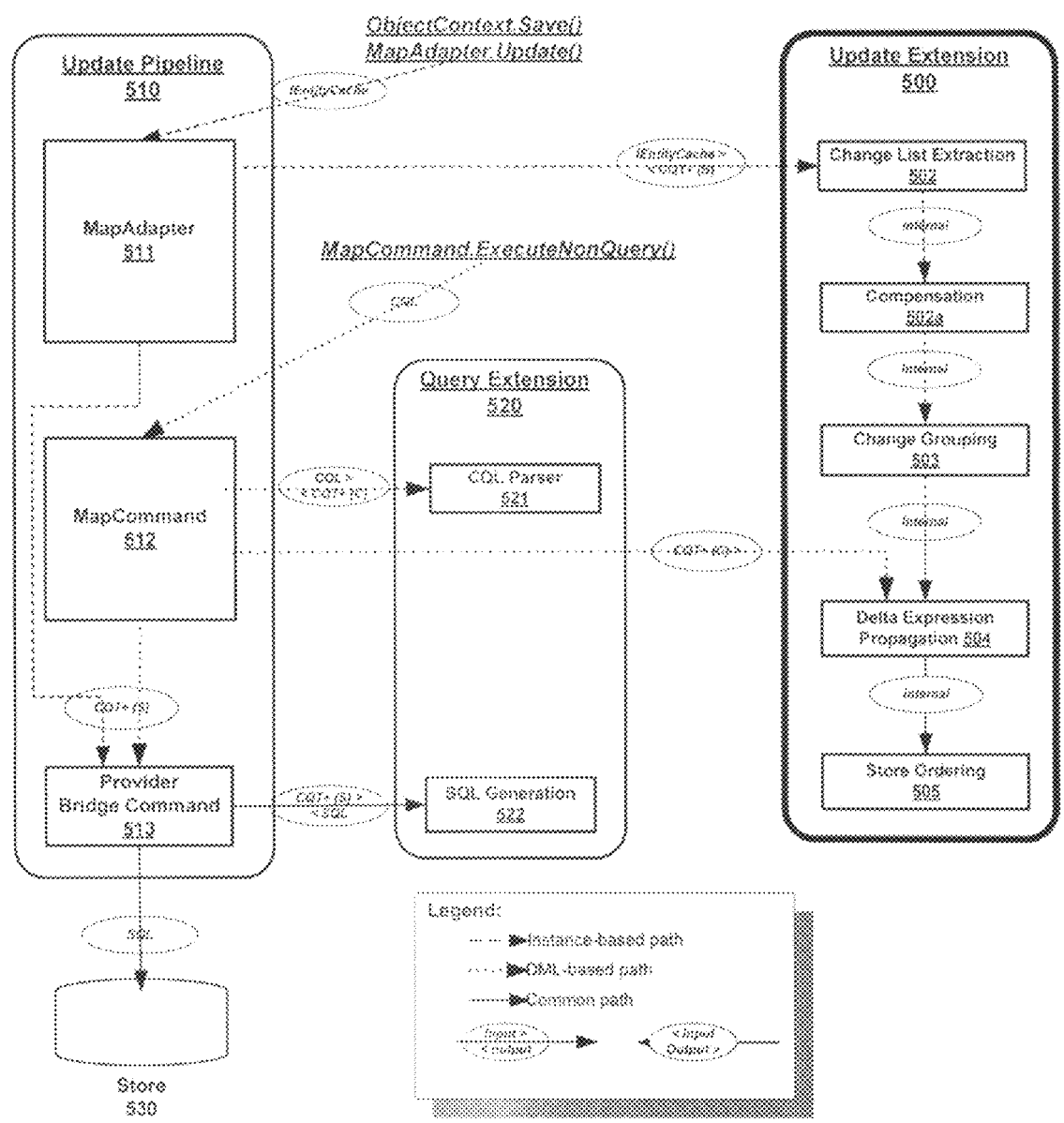
FIG. 12 illustrates one exemplary embodiment of an update pipeline as described herein.

FIG. 12 illustrates one embodiment of an update pipeline as described herein. FIG. 12 provides a control flow diagram that a variety of scenarios. The arrows in FIG. 12 mean invocation after which control is returned back to the caller. Input and output are placed in ellipses. Input is marked with an angle bracket pointing the same direction as the control flow, while output is marked with an angle bracket pointing the opposite direction of the control flow.

In FIG. 12, an update extension component 1200 is provided that may reside on a client or on a server associated with data store 1230. The update extension component 1200 comprises components as illustrated in FIG. 9, e.g., an extraction component 1202, a grouping component 1203, a propagation component 1204 and an ordering component 1205. Also, a compensation component 1202a is illustrated.

An update pipeline component 1210 may reside on a server associated with the data store 1230. This component 1210 comprises a map adapter component 1211, map command component 1212, and provider bridge command component 1213. Functions of the update pipeline component 1210 can be called, e.g., by the update extension 1200, using the illustrated function calls. The query extension component 1220 can comprise a CQL parser component 1221 and a Structured Query Language (SQL) Generation component.

Figure 13:
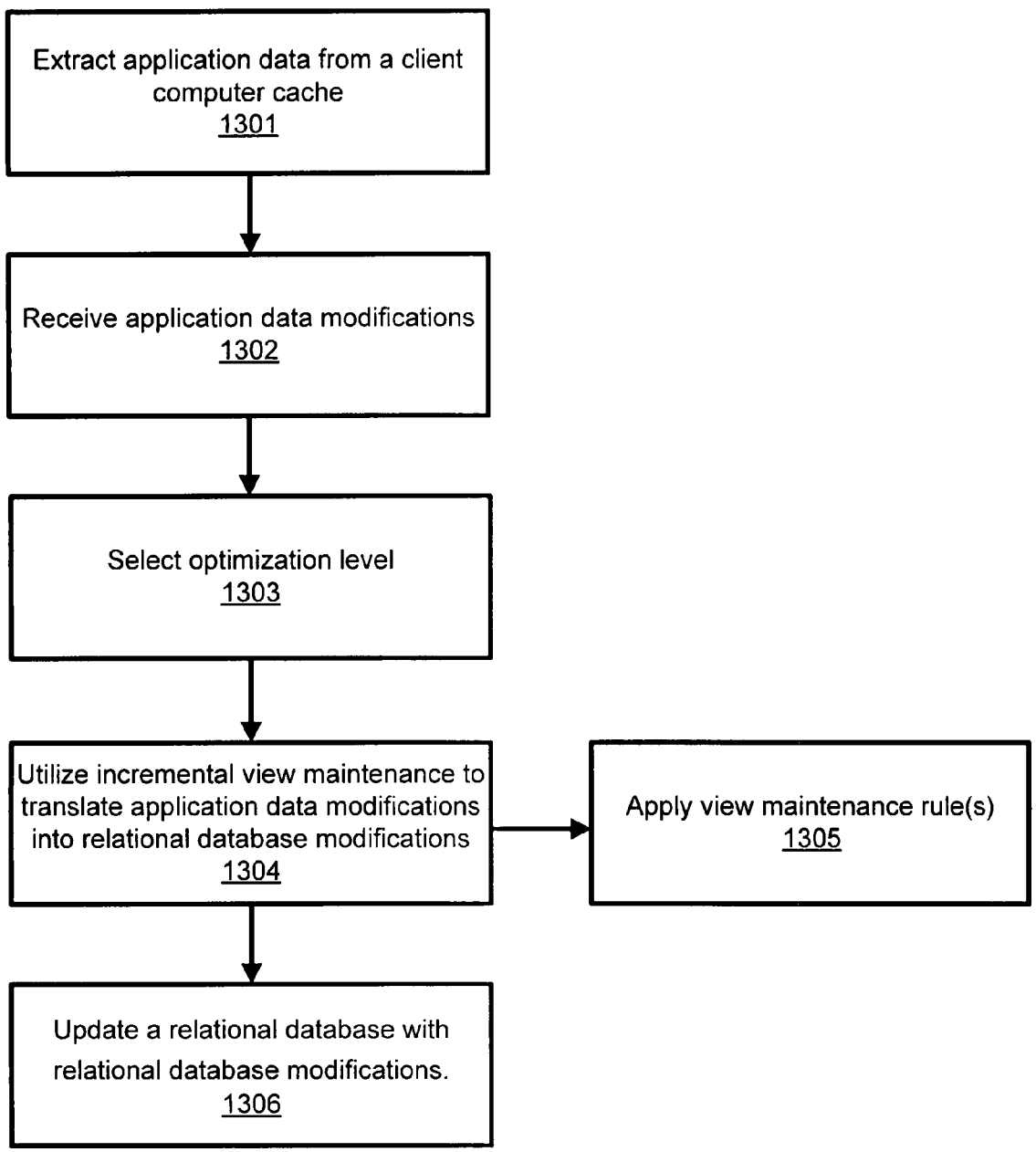
FIG. 13 illustrates a process comprising applying view maintenance rules at a selected optimization level when updating a relational database with data extracted from a client computer cache.

FIG. 13 illustrates a high level view of one embodiment. Many aspects of FIG. 13 are described above and should be familiar from reading the various described embodiments already provided. In general, FIG. 13 illustrates a method for providing data services to an application, and may also reflect instructions on computer readable media or subsystems included in a data access system as described herein.

FIG. 13 illustrates first extracting application data from a client computer cache 1301. Extracted data comprises application data modifications that are to be persisted to the store. Receiving, by a data access system, application data modifications 1302, is accomplished by virtue of performing the extracting, but may also be accomplished by receiving data that is "pushed" to the data access system by an application. Advantageously, application data modifications are expressed according to an application schema, so applications do not have to do the work of converting data to database format.

The method next comprises selecting an optimization level 1303, as described above, then utilizing incremental view maintenance 1304 to translate the application data modifications into relational database modifications expressed according to a database schema. Here, utilizing view maintenance 1304 comprises applying at least one view maintenance rule 1305 that specifies a view operator, and given the application data modifications, produces the appropriate relational database modifications. The view maintenance rule may comprise, for example, an insert rule selected from a group comprising a selection rule, a projection rule, a join rule, a union rule, and a semi-join rule. Alternatively, the view maintenance rule may comprise a delete rule selected from a group comprising a selection rule, a projection rule, a join rule, a union rule, and a semi-join rule.

In one-embodiment, the view maintenance rule may be given pre-existing data, in order to facilitate the translation, as described above. The version of the rule that is applied, and the type and amount of pre-existing data that is required, may be affected by the optimization level. As discussed above, the various optimization levels may include a traditional view maintenance level, an insert/delete/update compatible level, an insert/delete compatible level; and a modification requests only level.

Finally, a relational database 1306 is updated with the relational database modifications that are produced.

In addition to the specific implementations explicitly set forth herein, other aspects and implementations will be apparent to those skilled in the art from consideration of the specification disclosed herein. It is intended that the specification and illustrated implementations be considered as examples only, with a true scope and spirit of the following claims.

Insert Example
Store:
create table SPerson(pid int primary key, name nvarchar (255))
create table SAddress(aid int primary key, pid int references SPerson(pid), state nchar(2))

EDM:
EntityType EPerson<{int pid, string name}>Keys{pid;}
EntitySet CPerson<EPerson>
EntityType EAddress<{int aid, string state}>Keys{aid;}
EntitySet CAddress<EAddress>
Relationship RPersonAddress<EPerson, EAddress>(multiplicity one EPerson to many EAddress)
RelationshipSet CPersonAddress<RPersonAddress>
Update Mapping Views:
SPerson=SELECT p.pid, p.name FROM CPerson p
SAddress=SELECT pa.aid, p.pid, a.state FROM CAddress a,
CPersonAddress pa
   WHERE Key(pa.Address).aid=a.aid
Query Mapping Views:
CPerson=SELECT p.pid, p.name FROM SPerson p
CAddress=SELECT a.aid, a.state FROM SAddress a
CPersonAddress=SELECT a.aid, a.pid FROM SAddress a Suppose that the CPerson entity set contains a person whose name is "Joe" and has an address in "WA". Suppose that a new address is inserted for this person (state is "MA"). This can be expressed in terms of insert and delete sets:
   i(CAddress)={[aid2, "MA"]}
   i(CPersonAddress)={[aid2, pid1]}
   d(CAddress)=d(CPersonAddress)=i(CPerson)=d(CPerson)={ }

We now consider the changes to SAddress; we do not consider SPerson here since there is no change to it. The delta expression for SAddress based on the delta expression rules is (the delete set for SAddress is null):
   i(SAddress)=
     (i(CPersonAddress) JOIN ((CAddress−d(CAddress)) UNION
   i(CAddress)))
     UNION
     (i(CAddress) JOIN ((CPersonAddress−d(CPersonAddress)) UNION i(CPersonAddress)))

At this point, we substitute query views for remaining C-level constructs:
   i(SAddress)=
     (i (CPersonAddress) JOIN ((Proj$_{aid, state}$(SAddress)−d (CAddress)) UNION i(CAddress)))
     UNION
     (i (CAddress) JOIN ((Proj$_{aid, pid}$(SAddress)−d(CPersonAddress)) UNION i(CPersonAddress)))

The update pipeline resolves the insertion query for the SAddress table as follows:
i(SAddress)=
   {[aid2, pid1]}LEFT OUTER JOIN ({[aid1, "WA"]} UNION {[aid2, "MA"]})
   UNION
   {[aid2, "MA"]}LEFT OUTER JOIN ({[aid1, pid1]} UNION {[aid2, pid1]})
     ={(aid2, pid1, "MA"]} UNION {[aid2, pid1, "MA"]}
     ={[aid2, pid1, "MA"]}

Self-Association Example
   Consider the following EDM definition:
   EntityType EEmployee<{int eid, string name}>Keys{eid};
   EntitySet CEmployee<EEmployee>;
   Relationship REmployeeManager <EEmployee, EEmployee>(Multiplicity many EEmployee to one EEmployee; on delete EEmployee restrict);
   This is represented in the store as follows:
   CREATE TABLE SEmployee (eid int primary key, name nvarchar(max), mid int references SEmployee(eid))

The following mappings are specified:

```
[<e type EEmployee> in CEmployee : SEmployee]
    (e.eid, eid)
    (e.name, name)
[<e1 type EEmployee> in CEmployee, <e2 type EEmployee> in
    e1.CEmployeeManager : SEmployee]
    (e1.eid, eid)
    (e2.eid, mid)
```

Update View:
SEmployee=
SELECT e1.eid, e1.name, e2.eid
FROM CEmployee e1
LEFT OUTER JOIN CEmployeeManager em ON e1.eid=em.eid1
LEFT OUTER JOIN CEmployee e2 ON em.eid2=e2.eid WHERE type(e1)=EEmployee AND type(e2)=EEmployee Consider the following snapshot of the store (Joe manages John):

| eid | name | mid |
|---|---|---|
| 1 | Joe | NULL |
| 2 | John | 1 |

Let's say the cache identifies the following change sets:
I(CEmployee)={<3, Jane>, <4, Nancy>}
I(CEmployeeManager)={<3, 4>, <4, 2>}
After propagating these delta lists, we have:
I(SEmployee)={<3, Jane, 4>, <4, Nancy, 2>}
Depending on the store, there may be a problem if we insert rows into SEmployee one at a time. SQL Server enforces constraints on a per statement basis rather than at transaction commit time. Inserting Jane before Nancy causes a constraint violation:
begin tran
insert into SEmployee
values (3, 'Jane', 4)
insert into SEmployee
values (4, 'Nancy', 2)
commit tran
The INSERT statement conflicted with the FOREIGN KEY SAME TABLE constraint "FK_SEmployee_mid_1A14E395". The conflict occurred in database "Test", table "dbo.SEmployee", column 'eid'.

In this case, we need to identify row level dependency ordering constraints (to insert Nancy before Jane).
The alternative to intra-table dependency ordering is to batch all operations per table:
insert into SEmployee
select 3, 'Jane', 4
union all
select 4, 'Nancy', 2
Now consider the following updates:
U(CEmployee)={<1, Joe>→<5, Joe>}
U(CEmployeeManager)={<2, 1>→<2, 5>}
After propagating these delta lists, we have:
U(SEmployee)={<1, Joe, NULL>→<5, Joe, NULL>, <2, John, 1>→<2, John, 5>}
Again, the row-at-a-time translation causes a constraint violation. We can rewrite as follows:

```
declare @update_list table(
    eid_old int,
    eid_new int, mid_new int)
insert into @update_list values (1, 5, NULL)
insert into @update_list values (2, 2, 5)
update e
set e.eid = u.eid_new, e.mid = u.mid_new
from SEmployee e, @update_list u
where e.eid = u.eid_old
```

What is claimed:

1. A method for providing data services to an application, comprising:
receiving, by a data access system, application data modifications that modify instances of the application, the application data modifications being expressed according to an application schema;
extracting the application data modifications from a client cache that are to be persisted to a relational database, wherein the client cache is a cache operatively coupled to a server associated with the relational database;
generating a mapping view that maps a relationship between the application and the relational database, a mapping of the mapping view being specified using a declarative language and being compiled into bidirectional views; and
utilizing incremental view maintenance to materialize object instances that have changed in accordance with the mapping to translate the application data modifications into relational database modifications expressed according to a database schema for updating the relational database, utilizing incremental view maintenance comprising:
applying at least one view maintenance rule that specifies a view operator, and given the application data modifications, produces the relational database modifications;
identifying a minimum set of affected store tables in the database based on a set of changed materialized object instances;
identifying a minimum set of changes to a given store table based on a set of changed materialized entity instances based at least in part on an entity data model;
generating a dependency graph based on the set of changed materialized entity instances, wherein a node of the dependency graph represents an operation on a table of the relational database of a set of operations, and an edge in the dependency graph indicates that there is a dependency between two nodes connected by the edge, a dependency indicating that a first operation on the table relies on a result of having already performed a second operation;
ordering the set of operations based on the dependency graph; and
submitting the set of operations to the relational database based on the order.

2. The method of claim 1, wherein the at least one view maintenance rule is also given pre-existing data.

3. The method of claim 1, wherein the at least one view maintenance rule comprises an insert rule selected from a group comprising a selection rule, a projection rule, a join rule, a union rule, and a semi-join rule.

4. The method of claim 1, wherein the at least one view maintenance rule comprises a delete rule selected from a group comprising a selection rule, a projection rule, a join rule, a union rule, and a semi-join rule.

5. The method of claim 1, further comprising:
selecting an optimization level.

6. The method of claim 5, wherein applying at least one view maintenance rule comprises:
applying a version of the view maintenance rule corresponding to the optimization level.

7. The method of claim 5, wherein the selecting an optimization level comprises:
selecting the optimization level from among a plurality of optimization levels, the plurality of optimization levels requiring differing application data or relational database data when utilizing the incremental view maintenance.

8. The method of claim 7, wherein the plurality of optimization levels comprise:
a traditional view maintenance level;
an insert/delete/update compatible level;
an insert/delete compatible level; and
a modification requests only level.

9. The method of claim 1, wherein generating the dependency graph comprises:
while extracting the application data modifications from the client cache, applying an annotation to a key value that has a global identifier;
while compiling the set of operations, identifying that a server that maintains the relational database has generated a column of a table that contains the key value that has the global identifier; and
in response to identifying that the server that maintains the relational database has generated a column of the table that contains the key value that has the global identifier, registering a dependency from an operation producing the global identifier to an operation consuming the global identifier.

10. The method of claim 1, wherein generating the dependency graph comprises:
performing a topological sort on the dependency graph and removing each element for which there is an ordering to produce a remaining dependency graph;
decomposing at least one node of the remaining dependency graph into at least two row-level operations; and
topologically sorting the at least two row-level operations.

11. The method of claim 1, wherein generating the dependency graph comprises:
topologically sorting a plurality of nodes of the dependency graph.

12. A data access system for providing data services to an application, comprising:
a processor; and
a memory bearing instructions that, upon execution by the processor, cause the system at least to:
receive application data modifications that modify instances of the application, the application data modifications being expressed according to an application schema;
utilize incremental view maintenance to translate the application data modifications into relational database modifications expressed according to a database schema for updating a database, wherein incremental view maintenance further causes the system at least to:
generate a dependency graph based on a set of changed materialized entity instances in the incremental view maintenance, wherein a node of the dependency graph represents an operation on a table of the relational database of a set of operations, and an edge in the dependency graph indicates that there is a dependency between two nodes connected by the edge, a dependency indicating that a first operation on the table relies on a result of having already performed a second operation;
order the set of operations based on the dependency graph; and
apply the set of operations to the database based on the order.

13. The system of claim 12, wherein the instructions that, upon execution by the processor, cause the system at least to receive application data modifications further cause the system at least to:
extract the application data from a client computer cache.

14. The system of claim 12, wherein the instructions that, upon execution by the processor, cause the system at least to apply at least one view maintenance rule further cause the system at least to:
apply at least one view maintenance rule based on pre-existing data.

15. The system of claim 12, wherein the at least one view maintenance rule comprises an insert rule selected from a group comprising a selection rule, a projection rule, a join rule, a union rule, and a semi-join rule.

16. The system of claim 12, wherein the at least one view maintenance rule comprises a delete rule selected from a group comprising a selection rule, a projection rule, a join rule, a union rule, and a semi-join rule.

17. The system of claim 12, wherein the memory further bears instructions that, upon execution by the processor, cause the system at least to:
select an optimization level.

18. The system of claim 17, wherein the instructions that, upon execution by the processor, cause the system at least to apply at least one view maintenance rule further cause the system at least to:
apply a version of the view maintenance rule corresponding to the optimization level.

19. The system of claim 17, wherein the instructions that, upon execution by the processor, cause the system at least to apply an optimization level further cause the system at least to:
select the optimization level from among a plurality of optimization levels, the plurality of optimization levels requiring differing application data or relational database data when utilizing the incremental view maintenance.

20. The system of claim 19, wherein the plurality of optimization levels comprise:
a traditional view maintenance level;
an insert/delete/update compatible level;
an insert/delete compatible level; and
a modification requests only level.

21. A computer readable storage device bearing instructions for providing data services to an application, that, when executed on a computer, cause the computer to perform functions comprising:
receiving application data modifications that modify instances of the application, wherein the application data modifications are expressed according to an application schema; and
utilizing incremental view maintenance to translate the application data modifications into relational database modifications expressed according to a database schema for updating a database, utilizing incremental view maintenance comprises:

generating a dependency graph based on a set of changed materialized entity instances in the incremental view maintenance, wherein a node of the dependency graph represents an operation on a table of the relational database of a set of operations, and an edge in the dependency graph indicates that there is a dependency between two nodes connected by the edge, a dependency indicating that a first operation on the table relies on a result of having already performed a second operation;

order the set of operations based on the dependency graph; and ordering the set of operations based on the dependency graph; and applying at least one view maintenance rule that specifies a view operator, and given the application data modifications, produces the relational database modifications.

22. The computer readable storage device of claim 21, wherein receiving application data modifications comprises:
extracting the application data from a client computer cache.

23. The computer readable storage device of claim 21, further bearing instructions that, when executed on the computer, cause the computer to perform functions comprising:
updating the relational database with the relational database modifications.

24. The computer readable storage device of claim 21, wherein applying at least one view maintenance rule further comprises:
applying the at least one view maintenance rule based on pre-existing data.

25. The computer readable storage device of claim 21, wherein the at least one view maintenance rule comprises an insert rule selected from a group comprising a selection rule, a projection rule, a join rule, a union rule, and a semi-join rule.

26. The computer readable storage device of claim 21, wherein the at least one view maintenance rule comprises a delete rule selected from a group comprising a selection rule, a projection rule, a join rule, a union rule, and a semi-join rule.

27. The computer readable storage device of claim 21, further bearing instructions that, when executed on the computer, cause the computer to perform functions comprising:
selecting an optimization level.

28. The computer readable storage device of claim 27, wherein applying at least one view maintenance rule comprises:
applying a version of the view maintenance rule corresponding to the optimization level.

29. The computer readable storage device of claim 27, wherein selecting the optimization level comprises:
selecting the optimization level from among a plurality of optimization levels, the optimization levels requiring differing application data or relational database data when utilizing the incremental view maintenance.

30. The computer readable storage device of claim 29, wherein the plurality of optimization levels comprise:
a traditional view maintenance level;
an insert/delete/update compatible level;
an insert/delete compatible level; and
a modification requests only level.

* * * * *